(12) United States Patent
Raghothaman et al.

(10) Patent No.: US 11,304,213 B2
(45) Date of Patent: Apr. 12, 2022

(54) DYNAMIC UPLINK REUSE IN A C-RAN

(71) Applicant: CommScope Technologies LLC, Hickory, NC (US)

(72) Inventors: Balaji B Raghothaman, Chester Springs, PA (US); Stuart D. Sandberg, Acton, MA (US); Purnima Venkata Kompella, Bangalore (IN); Anil Bapat, Bangalore (IN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/413,360

(22) Filed: May 15, 2019

(65) Prior Publication Data

US 2019/0357232 A1    Nov. 21, 2019

Related U.S. Application Data

(60) Provisional application No. 62/672,396, filed on May 16, 2018.

(51) Int. Cl.
*H04W 72/12* (2009.01)
*H04W 72/04* (2009.01)
*H04W 52/08* (2009.01)
*H04L 5/00* (2006.01)
*H04W 52/24* (2009.01)
*H04B 17/336* (2015.01)
*H04W 52/14* (2009.01)

(52) U.S. Cl.
CPC ........ *H04W 72/121* (2013.01); *H04B 17/336* (2015.01); *H04L 5/0048* (2013.01); *H04L 5/0055* (2013.01); *H04W 52/08* (2013.01); *H04W 52/146* (2013.01); *H04W 52/24* (2013.01); *H04W 72/0413* (2013.01); *H04W 72/1268* (2013.01)

(58) Field of Classification Search
CPC . H04W 72/121; H04W 52/08; H04W 52/146; H04L 5/0048; H04B 17/336
See application file for complete search history.

(56) References Cited

U.S. PATENT DOCUMENTS

| | | |
|---|---|---|
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |
| 6,985,451 B1 | 1/2006 | Nattiv et al. |

(Continued)

FOREIGN PATENT DOCUMENTS

| | | |
|---|---|---|
| CN | 1719929 A | 1/2006 |
| CN | 101534507 A | 9/2009 |

(Continued)

OTHER PUBLICATIONS

"3rd Generation Partnership Project; Technical Specification Group Radio Access Network; Evolved Universal Terrestrial Radio Access (E-UTRA); Requirements for support of radio resource management", 3GPP, Mar. 2008, pp. 1-25, 3GPP Organizational Partners.

(Continued)

*Primary Examiner* — Wei Zhao
(74) *Attorney, Agent, or Firm* — Fogg & Powers LLC

(57) ABSTRACT

This disclosure is directed to techniques for implementing uplink spatial reuse in a C-RAN.

50 Claims, 7 Drawing Sheets

(56) References Cited

U.S. PATENT DOCUMENTS

Figure 1:
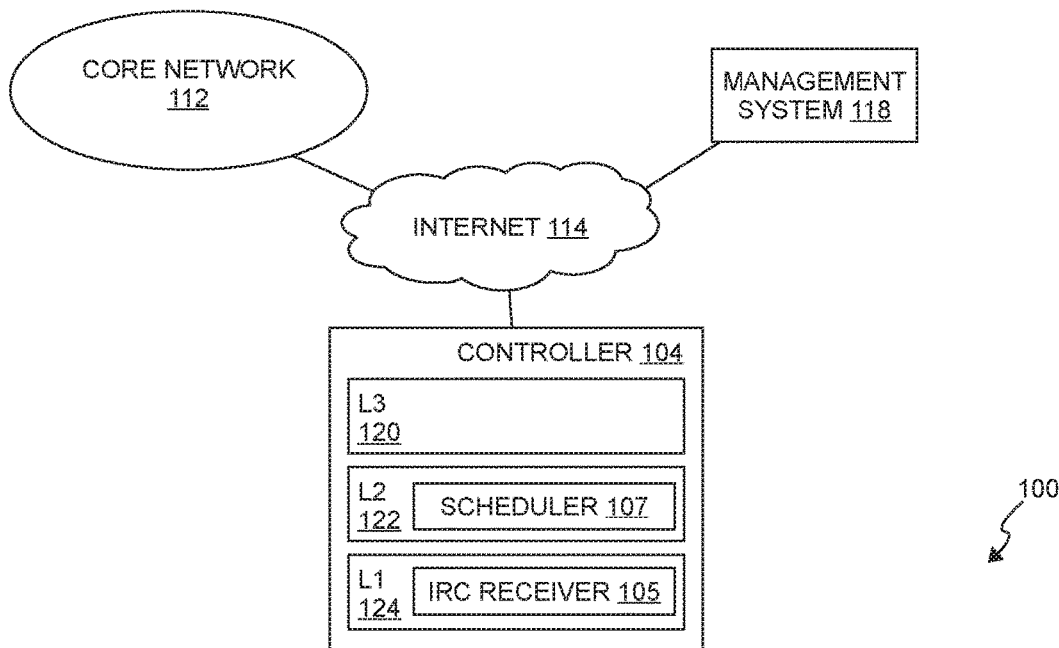
Figure 1:
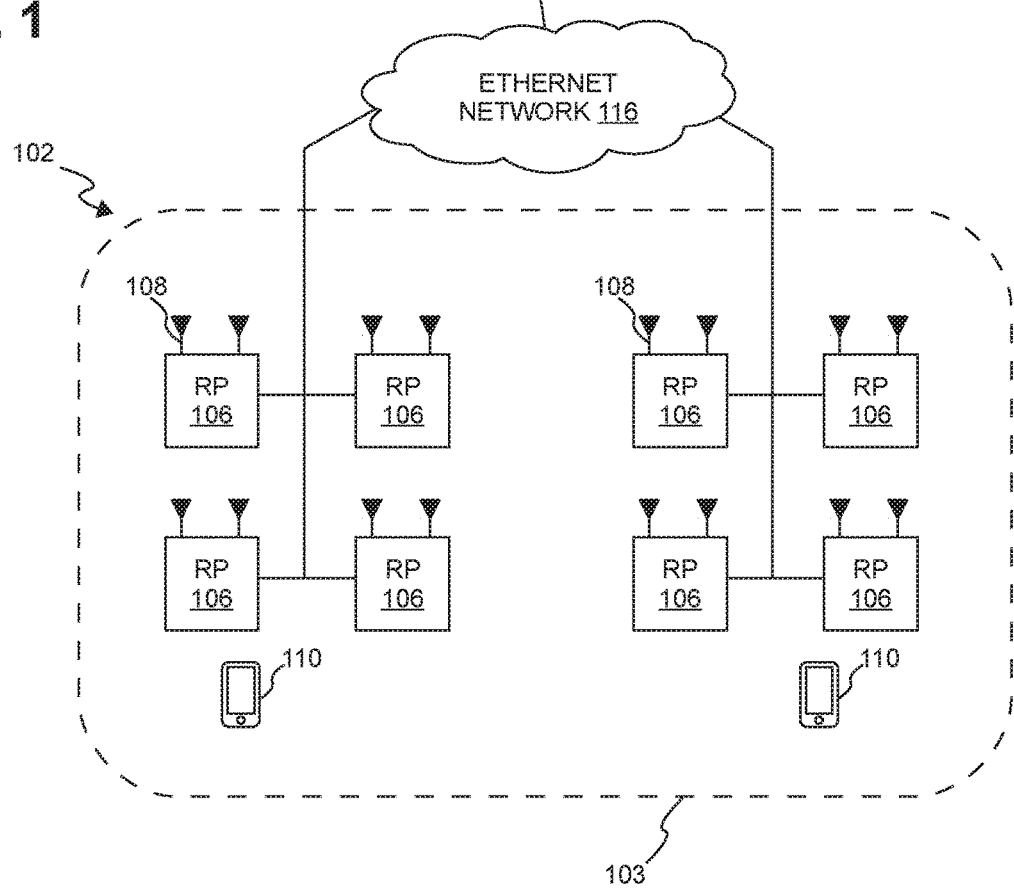

| | | |
|---|---|---|
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 7,415,242 B1 | 8/2008 | Ngan |
| 7,515,643 B2 | 4/2009 | Chung |
| 7,558,356 B2 | 7/2009 | Pollman et al. |
| 7,558,588 B2 | 7/2009 | To et al. |
| 7,603,127 B2 | 10/2009 | Chung et al. |
| 7,626,926 B2 | 12/2009 | Abi-Nassif et al. |
| 7,672,682 B2 | 3/2010 | Sharma et al. |
| 7,715,466 B1 | 5/2010 | Oh et al. |
| 7,729,243 B2 | 6/2010 | Ananthaiyer et al. |
| 7,730,189 B2 | 6/2010 | Harikumar et al. |
| 7,751,835 B2 | 7/2010 | Sharma et al. |
| 7,801,487 B2 | 9/2010 | Mehrabanzad et al. |
| 7,831,257 B2 | 11/2010 | Pollman et al. |
| 7,835,698 B2 | 11/2010 | Eyuboglu et al. |
| 7,843,892 B2 | 11/2010 | Mehrabanzad et al. |
| 7,860,513 B2 | 12/2010 | Chung et al. |
| 7,907,571 B2 | 3/2011 | Raghothaman et al. |
| 7,907,950 B2 | 3/2011 | Ihm et al. |
| 7,920,541 B2 | 4/2011 | To et al. |
| 7,926,098 B2 | 4/2011 | Chinitz et al. |
| 7,933,619 B2 | 4/2011 | Kim |
| 7,934,001 B2 | 4/2011 | Harikumar et al. |
| 7,953,040 B2 | 5/2011 | Harikumar et al. |
| 7,983,672 B2 | 7/2011 | Humblet et al. |
| 7,983,708 B2 | 7/2011 | Mehrabanzad et al. |
| 7,995,493 B2 | 8/2011 | Anderlind et al. |
| 8,023,439 B2 | 9/2011 | Rao |
| 8,060,058 B2 | 11/2011 | Ch'ng et al. |
| 8,078,165 B2 | 12/2011 | Mate et al. |
| 8,085,696 B2 | 12/2011 | Garg et al. |
| 8,094,630 B2 | 1/2012 | Garg et al. |
| 8,099,504 B2 | 1/2012 | Cherian et al. |
| 8,111,253 B2 | 2/2012 | Rao |
| 8,130,686 B2 | 3/2012 | Rao et al. |
| 8,140,091 B2 | 3/2012 | Chung et al. |
| 8,145,221 B2 | 3/2012 | Garg et al. |
| 8,160,020 B2 | 4/2012 | Eyuboglu et al. |
| 8,160,629 B2 | 4/2012 | Mate et al. |
| 8,160,631 B2 | 4/2012 | Raghothaman et al. |
| 8,160,829 B2 | 4/2012 | Kalenine |
| 8,165,528 B2 | 4/2012 | Raghothaman et al. |
| 8,170,598 B2 | 5/2012 | Raghothaman et al. |
| 8,176,327 B2 | 5/2012 | Xiong et al. |
| 8,194,597 B2 | 6/2012 | Feder et al. |
| 8,195,187 B2 | 6/2012 | Eyuboglu et al. |
| 8,229,397 B2 | 7/2012 | Hou et al. |
| 8,229,498 B2 | 7/2012 | Ch'ng et al. |
| 8,259,671 B2 | 9/2012 | Raghothaman et al. |
| 8,280,376 B2 | 10/2012 | Rajagopalan et al. |
| 8,290,527 B2 | 10/2012 | Richardson |
| 8,295,256 B2 | 10/2012 | Humblet et al. |
| 8,295,818 B2 | 10/2012 | Palnati et al. |
| 8,311,570 B2 | 11/2012 | Richardson |
| 8,326,342 B2 | 12/2012 | Raghothaman et al. |
| 8,340,636 B2 | 12/2012 | Yin et al. |
| 8,345,694 B2 | 1/2013 | Den et al. |
| 8,346,220 B2 | 1/2013 | Mate et al. |
| 8,355,727 B2 | 1/2013 | Hoang et al. |
| 8,358,623 B2 | 1/2013 | Samar et al. |
| 8,379,566 B2 | 2/2013 | Gao et al. |
| 8,379,625 B2 | 2/2013 | Humblet |
| 8,385,291 B2 | 2/2013 | Richardson et al. |
| 8,400,989 B2 | 3/2013 | Ch'ng et al. |
| 8,402,143 B2 | 3/2013 | Ramaswamy et al. |
| 8,428,601 B2 | 4/2013 | Samar et al. |
| 8,452,299 B2 | 5/2013 | Raghothaman |
| 8,457,084 B2 | 6/2013 | Valmikam et al. |
| 8,503,342 B2 | 8/2013 | Richardson |
| 8,520,659 B2 | 8/2013 | Humblet |
| 8,532,658 B2 | 9/2013 | Knisely |
| 8,542,707 B2 | 9/2013 | Hou et al. |
| 8,543,139 B2 | 9/2013 | Samar et al. |
| 8,554,231 B2 | 10/2013 | Jones |
| 8,594,663 B2 | 11/2013 | Ch'ng et al. |
| 8,599,711 B2 | 12/2013 | Hugl et al. |
| 8,615,238 B2 | 12/2013 | Eyuboglu et al. |
| 8,615,593 B2 | 12/2013 | Ch'ng et al. |
| 8,619,702 B2 | 12/2013 | Garg et al. |
| 8,639,247 B2 | 1/2014 | Ng et al. |
| 8,676,729 B1 | 3/2014 | Keralapura et al. |
| 8,688,809 B2 | 4/2014 | Ch'ng et al. |
| 8,693,987 B2 | 4/2014 | Chiussi et al. |
| 8,705,483 B2 | 4/2014 | Liu |
| 8,718,697 B2 | 5/2014 | Srinivas et al. |
| 8,731,574 B2 | 5/2014 | Ch'ng et al. |
| 8,744,374 B2 | 6/2014 | Aue et al. |
| 8,750,271 B2 | 6/2014 | Jones |
| 8,774,134 B2 | 7/2014 | Raghothaman et al. |
| 8,781,483 B2 | 7/2014 | Ch'ng |
| 8,805,371 B2 | 8/2014 | Richardson et al. |
| 8,843,638 B2 | 9/2014 | Garg et al. |
| 8,873,512 B2 | 10/2014 | Richardson et al. |
| 8,886,249 B2 | 11/2014 | Richardson |
| 8,909,278 B2 | 12/2014 | Rao et al. |
| 8,942,136 B2 | 1/2015 | Humblet |
| 8,953,566 B2 | 2/2015 | Hegde et al. |
| 8,958,809 B2 | 2/2015 | Nama et al. |
| 8,982,841 B2 | 3/2015 | Srinivasan |
| 9,078,284 B2 | 7/2015 | Richardson |
| 9,380,466 B2 | 6/2016 | Eyuboglu et al. |
| 9,414,399 B2 | 8/2016 | Eyuboglu et al. |
| 9,877,340 B1 | 1/2018 | Park et al. |
| 9,936,470 B2 | 4/2018 | Eyuboglu et al. |
| 9,998,310 B2 | 6/2018 | Barbieri et al. |
| 10,057,916 B2 | 8/2018 | Barabell et al. |
| 10,064,072 B2 | 8/2018 | Eyuboglu et al. |
| 10,097,391 B2 | 10/2018 | Fertonani et al. |
| 10,149,312 B2 | 12/2018 | Yan et al. |
| 10,292,175 B2 | 5/2019 | Eyuboglu et al. |
| 10,355,895 B2 | 7/2019 | Barbieri et al. |
| 2002/0128009 A1 | 9/2002 | Boch et al. |
| 2002/0154055 A1 | 10/2002 | Davis et al. |
| 2002/0194605 A1 | 12/2002 | Cohen et al. |
| 2004/0136373 A1 | 7/2004 | Bareis |
| 2004/0143442 A1 | 7/2004 | Knight |
| 2004/0146072 A1 | 7/2004 | Farmwald |
| 2004/0224637 A1 | 11/2004 | Silva et al. |
| 2005/0025160 A1 | 2/2005 | Meier et al. |
| 2005/0073964 A1 | 4/2005 | Schmidt et al. |
| 2005/0157675 A1 | 7/2005 | Feder et al. |
| 2006/0056459 A1 | 3/2006 | Stratton et al. |
| 2006/0056559 A1 | 3/2006 | Pleasant et al. |
| 2006/0209752 A1 | 9/2006 | Wijngaarden et al. |
| 2007/0023419 A1 | 2/2007 | Ptasienski et al. |
| 2007/0058683 A1 | 3/2007 | Futami et al. |
| 2007/0086487 A1 | 4/2007 | Yasuda et al. |
| 2007/0140218 A1 | 6/2007 | Nair et al. |
| 2007/0207838 A1 | 9/2007 | Kuwahara et al. |
| 2007/0220573 A1 | 9/2007 | Chiussi et al. |
| 2007/0230419 A1 | 10/2007 | Raman et al. |
| 2007/0242648 A1 | 10/2007 | Garg et al. |
| 2008/0003988 A1 | 1/2008 | Richardson |
| 2008/0137606 A1 | 6/2008 | Zuniga et al. |
| 2008/0200202 A1 | 8/2008 | Montojo et al. |
| 2008/0233886 A1 | 9/2008 | Kaminski et al. |
| 2008/0240034 A1 | 10/2008 | Gollamudi |
| 2009/0097444 A1 | 4/2009 | Lohr et al. |
| 2009/0135718 A1 | 5/2009 | Yeo et al. |
| 2009/0149221 A1 | 6/2009 | Liu et al. |
| 2009/0180423 A1 | 7/2009 | Kroener |
| 2009/0180435 A1 | 7/2009 | Sarkar |
| 2009/0265599 A1 | 10/2009 | Chae et al. |
| 2009/0276542 A1 | 11/2009 | Aweya et al. |
| 2009/0287976 A1 | 11/2009 | Wang et al. |
| 2009/0300453 A1 | 12/2009 | Sahara |
| 2009/0316626 A1 | 12/2009 | Lee et al. |
| 2009/0327829 A1 | 12/2009 | Yang et al. |
| 2010/0011269 A1 | 1/2010 | Budianu et al. |
| 2010/0011271 A1 | 1/2010 | Giancola et al. |

(56) References Cited

U.S. PATENT DOCUMENTS

| | | |
|---|---|---|
| 2010/0034135 A1 | 2/2010 | Kim et al. |
| 2010/0037115 A1 | 2/2010 | Zheng |
| 2010/0062768 A1 | 3/2010 | Lindqvist et al. |
| 2010/0069112 A1 | 3/2010 | Sun et al. |
| 2010/0115367 A1 | 5/2010 | Hsu |
| 2010/0118777 A1 | 5/2010 | Yamada et al. |
| 2010/0142494 A1 | 6/2010 | Hsu |
| 2010/0167718 A1 | 7/2010 | Chiussi et al. |
| 2010/0169732 A1 | 7/2010 | Wu |
| 2010/0178875 A1 | 7/2010 | Oh et al. |
| 2010/0185911 A1 | 7/2010 | Cheng |
| 2010/0234035 A1 | 9/2010 | Fujishima et al. |
| 2010/0246513 A1 | 9/2010 | Lindskog et al. |
| 2010/0257419 A1 | 10/2010 | Sung et al. |
| 2011/0081930 A1 | 4/2011 | Shimonabe et al. |
| 2011/0134862 A1 | 6/2011 | Huang et al. |
| 2011/0145672 A1 | 6/2011 | Jongren et al. |
| 2011/0170517 A1 | 7/2011 | Bakker et al. |
| 2011/0182255 A1 | 7/2011 | Kim et al. |
| 2011/0194548 A1 | 8/2011 | Feder et al. |
| 2011/0194630 A1 | 8/2011 | Yang et al. |
| 2011/0207415 A1 | 8/2011 | Luo et al. |
| 2011/0268007 A1 | 11/2011 | Barany et al. |
| 2011/0268028 A1 | 11/2011 | Stern-Berkowitz et al. |
| 2011/0287791 A1 | 11/2011 | Fujishima et al. |
| 2011/0310802 A1 | 12/2011 | Song et al. |
| 2012/0057572 A1 | 3/2012 | Evans et al. |
| 2012/0127947 A1 | 5/2012 | Usui |
| 2012/0140660 A1 | 6/2012 | Kang et al. |
| 2012/0147815 A1 | 6/2012 | Meyer et al. |
| 2012/0176884 A1 | 7/2012 | Zhang et al. |
| 2012/0176966 A1 | 7/2012 | Ling |
| 2012/0176980 A1 | 7/2012 | Moon et al. |
| 2012/0176996 A1 | 7/2012 | Kim et al. |
| 2012/0188929 A1 | 7/2012 | Zhang et al. |
| 2012/0189074 A1 | 7/2012 | Jin et al. |
| 2012/0195284 A1 | 8/2012 | Mann et al. |
| 2012/0207105 A1 | 8/2012 | Geirhofer et al. |
| 2012/0208581 A1 | 8/2012 | Ishida et al. |
| 2012/0213109 A1 | 8/2012 | Xu et al. |
| 2012/0250520 A1 | 10/2012 | Chen et al. |
| 2012/0250740 A1 | 10/2012 | Ling |
| 2012/0257570 A1 | 10/2012 | Jang et al. |
| 2012/0264470 A1 | 10/2012 | Bajj et al. |
| 2012/0281656 A1 | 11/2012 | Hooli et al. |
| 2012/0300635 A1 | 11/2012 | Jersenius et al. |
| 2012/0300766 A1 | 11/2012 | Chen et al. |
| 2012/0322492 A1 | 12/2012 | Koo et al. |
| 2013/0016686 A1 | 1/2013 | Li et al. |
| 2013/0029711 A1 | 1/2013 | Kang et al. |
| 2013/0034197 A1 | 2/2013 | Aweya et al. |
| 2013/0100948 A1 | 4/2013 | Irvine |
| 2013/0136053 A1 | 5/2013 | Kim et al. |
| 2013/0136104 A1 | 5/2013 | Samar et al. |
| 2013/0194985 A1 | 8/2013 | Zetterman et al. |
| 2013/0223307 A1 | 8/2013 | Ohlsson et al. |
| 2013/0223365 A1 | 8/2013 | Choi et al. |
| 2013/0223391 A1 | 8/2013 | Koo et al. |
| 2013/0229992 A1 | 9/2013 | Yue et al. |
| 2013/0242837 A1 | 9/2013 | Yang et al. |
| 2013/0242919 A1 | 9/2013 | Koo et al. |
| 2013/0250869 A1 | 9/2013 | Eriksson |
| 2013/0279452 A1 | 10/2013 | Liu |
| 2013/0281049 A1 | 10/2013 | Lee et al. |
| 2013/0294403 A1 | 11/2013 | Srinivasan |
| 2014/0003389 A1 | 1/2014 | Wang et al. |
| 2014/0031036 A1 | 1/2014 | Koo et al. |
| 2014/0044057 A1 | 2/2014 | Gaal et al. |
| 2014/0071868 A1 | 3/2014 | Bergquist et al. |
| 2014/0086112 A1 | 3/2014 | Stern-Berkowitz et al. |
| 2014/0126438 A1 | 5/2014 | Zhu et al. |
| 2014/0161070 A1 | 6/2014 | Chang et al. |
| 2014/0162664 A1 | 6/2014 | Stapleton et al. |
| 2014/0177549 A1 | 6/2014 | Knisely |
| 2014/0211690 A1 | 7/2014 | Nama et al. |
| 2014/0212269 A1 | 7/2014 | Kastner et al. |
| 2014/0219162 A1 | 8/2014 | Eyuboglu et al. |
| 2014/0219255 A1 | 8/2014 | Eyuboglu et al. |
| 2014/0219267 A1 | 8/2014 | Eyuboglu et al. |
| 2015/0011219 A1 | 1/2015 | Sally et al. |
| 2015/0085720 A1 | 3/2015 | Gaal et al. |
| 2015/0172023 A1 | 6/2015 | Yang et al. |
| 2015/0193282 A1 | 7/2015 | Blocksome |
| 2015/0256297 A1 | 9/2015 | Yang et al. |
| 2015/0304960 A1 | 10/2015 | Yang et al. |
| 2015/0358982 A1 | 12/2015 | Jeon et al. |
| 2016/0037550 A1 | 2/2016 | Barabell et al. |
| 2016/0044548 A1 | 2/2016 | Choi et al. |
| 2016/0227555 A1 | 8/2016 | Haberland et al. |
| 2016/0302088 A1 | 10/2016 | Eyuboglu et al. |
| 2016/0309347 A1 | 10/2016 | Eyuboglu et al. |
| 2016/0345342 A1 | 11/2016 | Eyuboglu et al. |
| 2017/0070961 A1 | 3/2017 | Bharadwaj et al. |
| 2017/0077607 A1 | 3/2017 | Han et al. |
| 2017/0163330 A1 | 6/2017 | Raleigh et al. |
| 2017/0188368 A1 | 6/2017 | Cariou et al. |
| 2017/0373890 A1 | 12/2017 | Fertonani et al. |
| 2018/0034530 A1 | 2/2018 | Tarlazzi et al. |
| 2018/0287696 A1 | 10/2018 | Barbieri et al. |
| 2018/0309464 A1* | 10/2018 | Mandegaran ............ H04B 1/52 |
| 2019/0007246 A1 | 1/2019 | Fertonani et al. |
| 2019/0069190 A1 | 2/2019 | Eyuboglu et al. |
| 2019/0075576 A1 | 3/2019 | Eyuboglu et al. |
| 2019/0104527 A1 | 4/2019 | Raghothaman et al. |
| 2019/0116568 A1 | 4/2019 | Fertonani et al. |
| 2019/0191464 A1* | 6/2019 | Loehr .................. H04W 72/14 |
| 2019/0200248 A1* | 6/2019 | Basu Mallick ..... H04L 41/0672 |
| 2019/0208575 A1 | 7/2019 | Barbieri et al. |
| 2020/0092901 A1 | 3/2020 | Barabell et al. |
| 2020/0359383 A1 | 11/2020 | Lemson et al. |
| 2021/0314975 A1 | 10/2021 | Barabell et al. |

FOREIGN PATENT DOCUMENTS

| | | |
|---|---|---|
| CN | 102111180 A | 6/2011 |
| CN | 102340823 A | 2/2012 |
| CN | 103369582 A | 10/2013 |
| CN | 106797641 A | 5/2017 |
| CN | 108541360 A | 9/2018 |
| EP | 1134935 A2 | 9/2001 |
| EP | 2352264 A1 | 8/2011 |
| EP | 2693653 A1 | 2/2014 |
| EP | 2787646 A1 | 10/2014 |
| EP | 3094155 A1 | 11/2016 |
| EP | 3269118 A2 | 1/2018 |
| WO | 200814363 A3 | 3/2009 |
| WO | 2010078811 A1 | 7/2010 |
| WO | 2013036029 A1 | 3/2013 |
| WO | 2014124160 A2 | 8/2014 |
| WO | 2015191530 A2 | 12/2015 |
| WO | 2016145371 A2 | 9/2016 |
| WO | 2017070635 A1 | 4/2017 |
| WO | 2017100096 A1 | 6/2017 |
| WO | 2018017468 A1 | 1/2018 |

OTHER PUBLICATIONS

"3rd Generation Partnership Project; Technical Specification Group Radio Access Network; Evolved Universal Terrestrial Radio Access (E-UTRA); Base Station (BS) radio transmission and reception", 3GPP, Dec. 2007, pp. 1-47, 3GPP Organizational Partners.

"Small Cell Virtualization Functional Splits and Use Cases", Small Cell Forum, Jun. 2015, pp. 1-58, www.smallcellforum.com.

Belhouchet et al., "4G Wireless Systems, LTE Technology, Session 3: LTE Overview—Design Targets and Multiple Access Technologies", ITU/BDT Arab Regional Workshop, 2010, pp. 1-82, ERT.

Dotsch, et al., "Quantitative Analysis of Split Base Station Processing and Determination of Advantageous Architectures for LTE", Bell Labs Technical Journal, 2013, pp. 1-24, vol. 18, No. 1, Wiley Periodicals.

(56) References Cited

OTHER PUBLICATIONS

Garner, "IEEE 1588 Version 2", ISPCS, Sep. 24, 2008, pp. 1-89.
Haberland et al., "Base Stations in the Cloud", Alcatel-Lucent, Sep. 28, 2012, pp. 1-23, www.alcatel-lucent.com.
International Searching Authority, "International Search Report and Written Opinion from PCT Application No. PCT/US2018/053847 dated Feb. 1, 2019", from Foreign Counterpart to U.S. Appl. No. 16/149,294, dated Feb. 1, 2019, pp. 1-11, Published: WO.
Ma et al., "Radiostar: Providing Wireless Coverage Over Gigabit Ethernet", Bell Labs Technical Journal, 2009, pp. 1-18, vol. 14, No. 1, Wiley Periodicals.
Zhu et al., "Virtual Base Station Pool: Towards a Wireless Network Cloud for Radio Access Networks", May 17, 2010, pp. 1-10.
International Searching Authority, "International Search Report and Written Opinion from PCT Application No. PCT/US2019/032508 dated Aug. 29, 2019", from Foreign Counterpart to U.S. Appl. No. 16/413,360, pp. 1-21, Published: WO.
U.S. Patent and Trademark Office, "Office Action", U.S. Appl. No. 16/149,294, dated Jan. 8, 2020, pp. 1-70, Published: US.
International Bureau, "International Preliminary Report on Patentability from PCT Application No. PCT/US2018/053847", from Foreign Counterpart to U.S. Appl. No. 16/149,294, dated Apr. 16, 2020, pp. 1 through 7, Published: WO.
U.S. Patent and Trademark Office, "Final Office Action", U.S. Appl. No. 16/149,294, dated Jul. 30, 2020, pp. 1 through 17, Published: US.
U.S. Patent and Tradmemark Office, "Advisory Action", U.S. Appl. No. 16/149,294, dated Oct. 15, 2020, pp. 1 through 6, Published: US.
U.S. Patent and Trademark Office, "Notice of Allowance", U.S. Appl. No. 16/149,294, dated Mar. 26, 2021, pp. 1 through 17, Published: US.
U.S. Patent and Trademark Office, "Notice of Allowance", U.S. Appl. No. 16/149,294, dated Oct. 25, 2021, pp. 1 through 15, Published: US.
European Patent Office, "Extended European Search Report from EP Application No. 19803808.5", from Foreign Counterpart to U.S. Appl. No. 16/413,360, dated Dec. 17, 2021, pp. 1 through 14, Published: EP.

* cited by examiner

DYNAMIC UPLINK REUSE IN A C-RAN

CROSS-REFERENCE TO RELATED APPLICATION

This application claims the benefit of U.S. Provisional Patent Application Ser. No. 62/672,396, filed on May 16, 2018, and titled "DYNAMIC UPLINK REUSE IN A C-RAN", which is hereby incorporated herein by reference.

BACKGROUND

A centralized radio access network (C-RAN) is one way to implement base station functionality. Typically, for each cell implemented by a C-RAN, a single baseband unit (BBU) interacts with multiple remote units (also referred to here as "radio points" or "RPs") in order to provide wireless service to various items of user equipment (UEs).

As used here, "uplink reuse" refers to situations where separate uplink data is simultaneously transmitted from multiple UEs to a C-RAN base station on the Physical Uplink Shared Channel (PUSCH) using a C-RAN the same resource elements (that is, the same time-frequency resource). Typically, these situations arise when the UEs are sufficiently physically separated from each other so that the different uplink transmissions on the PUSCH do not interfere with each other when transmitted from UEs. This type of reuse is also referred to as "spatial uplink reuse."

Conventional techniques for implementing spatial uplink reuse are often relatively simplistic or conservative, which can result in relatively few opportunities to employ spatial uplink reuse, in spatial uplink reuse being employed in inappropriate situations (for example, due to one or more of the UEs moving), and/or spatial uplink resource degrading overall system performance.

SUMMARY

One embodiment is directed to a system to provide wireless service. The system comprises a controller and a plurality of radio points. Each of the radio points is associated with at least one antenna and remotely located from the controller, wherein the plurality of radio points is communicatively coupled to the controller. The controller and the plurality of radio points are configured to implement a base station in order to provide wireless service to a plurality of user equipment (UEs) using a cell. The controller is communicatively coupled to a core network of a wireless service provider. The controller is configured to implement a scheduler to schedule uplink transmissions from the UEs. The controller is configured to implement a combining receiver to receive uplink transmissions from each UE, the combining receiver configured to combine data indicative of the uplink transmissions from each UE as received at each radio point included in a combining zone assigned to that UE and communicated to the controller. The controller is configured to assign, to each UE, a respective minimum combining zone comprising a respective minimum subset of the radio points for use as the combining zone of the combining receiver for receiving uplink transmission from that UE. The controller is configured to assign, to each UE, a respective signal zone comprising a respective subset of the radio points that can be included in the combining zone of the combining receiver for receiving uplink transmission from that UE. The scheduler is configured to determine if multiple UEs are able to make respective uplink transmissions during a respective same time-and-frequency resource based on the respective minimum combining zones and signal zones assigned to the UEs and allocate time-and-frequency resources to the UEs using the minimum combining zones assigned to the UEs. The scheduler is configured to, after allocating time-and-frequency resources to the UEs, attempt to expand the combining zones used for receiving uplink transmissions.

Another embodiment is directed to a system to provide wireless service. The system comprises a controller and a plurality of radio points. Each of the radio points is associated with at least one antenna and remotely located from the controller, wherein the plurality of radio points is communicatively coupled to the controller. The controller and the plurality of radio points are configured to implement a base station in order to provide wireless service to a plurality of user equipment (UEs) using a cell. The controller is communicatively coupled to a core network of a wireless service provider. The controller is configured to implement a scheduler to schedule uplink transmissions from the UEs. The scheduler is configured to determine if multiple UEs are able to make respective uplink transmissions during a respective same time-and-frequency resource, and, for any multiple UEs that are able to make respective uplink transmissions during the respective same time-and-frequency resource, schedule said multiple UEs to make respective uplink transmissions during the respective same time-and-frequency resource and assign respective UE-specific demodulation reference signal (DM-RS) cyclic shifts to said multiple UEs. Each of the UE-specific DM-RS cyclic shifts have an associated distance between that UE-specific DM-RS cyclic shift and each of the other UE-specific DM-RS cyclic shifts, wherein the DM-RS cyclic shifts are assigned to maximize the respective distances.

Another embodiment is directed to a system to provide wireless service. The system comprises a controller and a plurality of radio points. Each of the radio points is associated with at least one antenna and remotely located from the controller, wherein the plurality of radio points is communicatively coupled to the controller. The controller and the plurality of radio points are configured to implement a base station in order to provide wireless service to a plurality of user equipment (UEs) using a cell. The controller is communicatively coupled to a core network of a wireless service provider. The controller is configured to implement a scheduler to schedule uplink transmissions from the UEs. The scheduler is configured to determine if multiple UEs are able to make respective uplink transmissions during a respective same time-and-frequency resource, and, for any multiple UEs that are able to make respective uplink transmissions during the respective same time-and-frequency resource, schedule said multiple UEs to make respective uplink transmissions during the respective same time-and-frequency resource. The controller is configured to perform transmit power control for the uplink transmissions from the UEs using at least one of the following: a closed-loop UE-specific target SINR that is adapted for each UE based on a power headroom reported for that UE; and a closed-loop UE-specific measured SINR that uses: a signal power measurement based on uplink transmissions from that UE, and an interference-plus-noise measurement based on uplink transmissions from all scheduled UEs.

Another embodiment is directed to a system to provide wireless service. The system comprises a controller and a plurality of radio points. Each of the radio points is associated with at least one antenna and remotely located from the controller, wherein the plurality of radio points is communicatively coupled to the controller. The controller and the plurality of radio points are configured to implement a base station in order to provide wireless service to a plurality of user equipment (UEs) using a cell. The controller is communicatively coupled to a core network of a wireless service provider. The controller is configured to implement a scheduler to schedule uplink transmissions from the UEs. The scheduler is configured to determine if multiple UEs are able to make respective uplink transmissions during a respective same time-and-frequency resource, and, for any multiple UEs that are able to make respective uplink transmissions during the respective same time-and-frequency resource, schedule said multiple UEs to make respective uplink transmissions during the respective same time-and-frequency resource. The controller is configured to perform transmit power control for the uplink transmissions from the UEs using at least one of the following: a closed-loop UE-specific target signal-to-interference-plus-noise ratio (SINK) that is adapted for each UE based on a power headroom reported for that UE; and a closed-loop UE-specific measured SINR that uses: a signal power measurement based on uplink transmissions from that UE, and an interference-plus-noise measurement based on uplink transmissions from all scheduled UEs.

DRAWINGS

FIG. 1 is a block diagram illustrating one exemplary embodiment of a radio access network (RAN) system in which the dynamic reuse techniques described here can be implemented.

Figure 2:
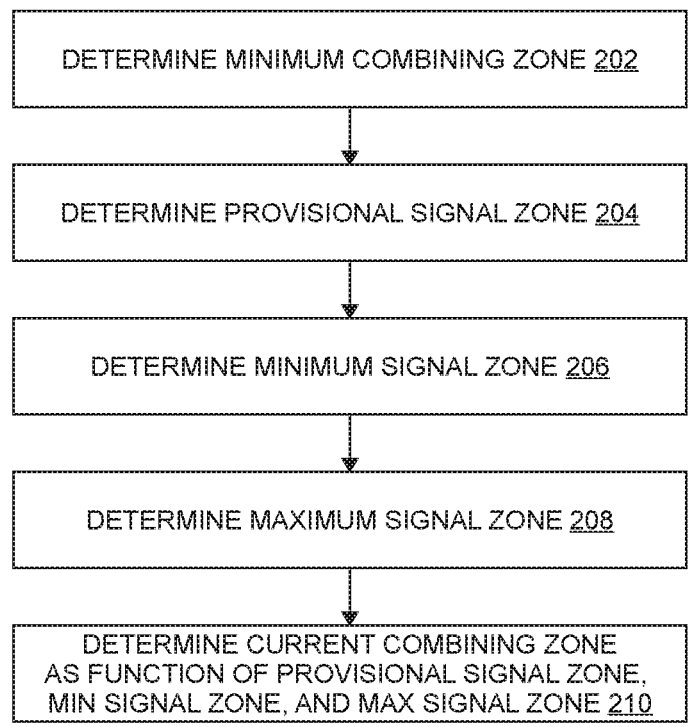

FIG. 2 comprises a flow chart illustrating one exemplary embodiment of a method of determining a minimum combining zone, a maximum combining zone, and a current combining zone for a UE in a C-RAN.

Figure 3:
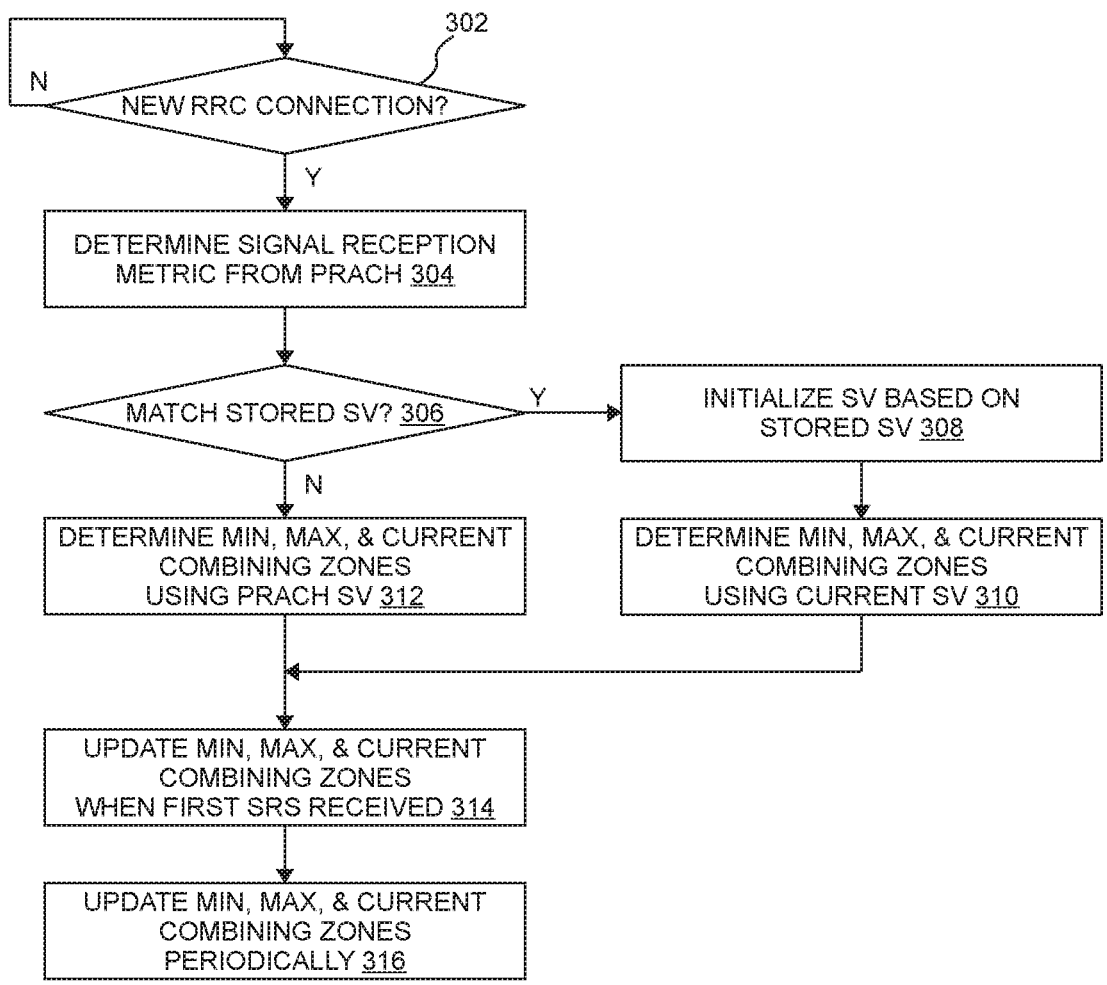

FIG. 3 comprises a flow chart illustrating one exemplary embodiment of a method of dynamically managing a minimum combining zone, a maximum combining zone, and a current combining zone for a UE over the course of a connection to a C-RAN.

Figure 4:
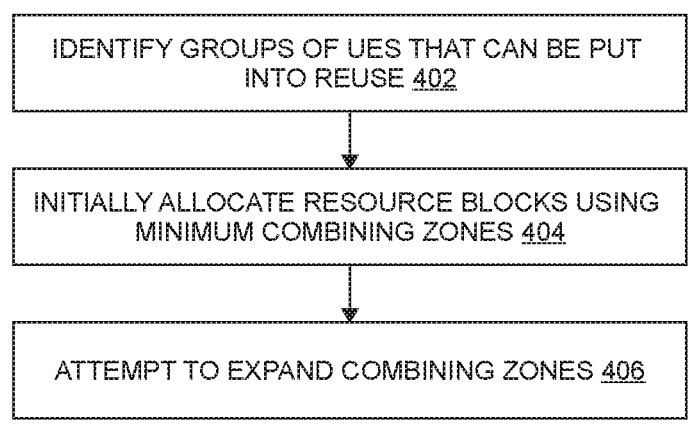

FIG. 4 comprises a flow chart illustrating one exemplary embodiment of a method of scheduling UEs that are put into uplink reuse in a C-RAN.

Figure 5:
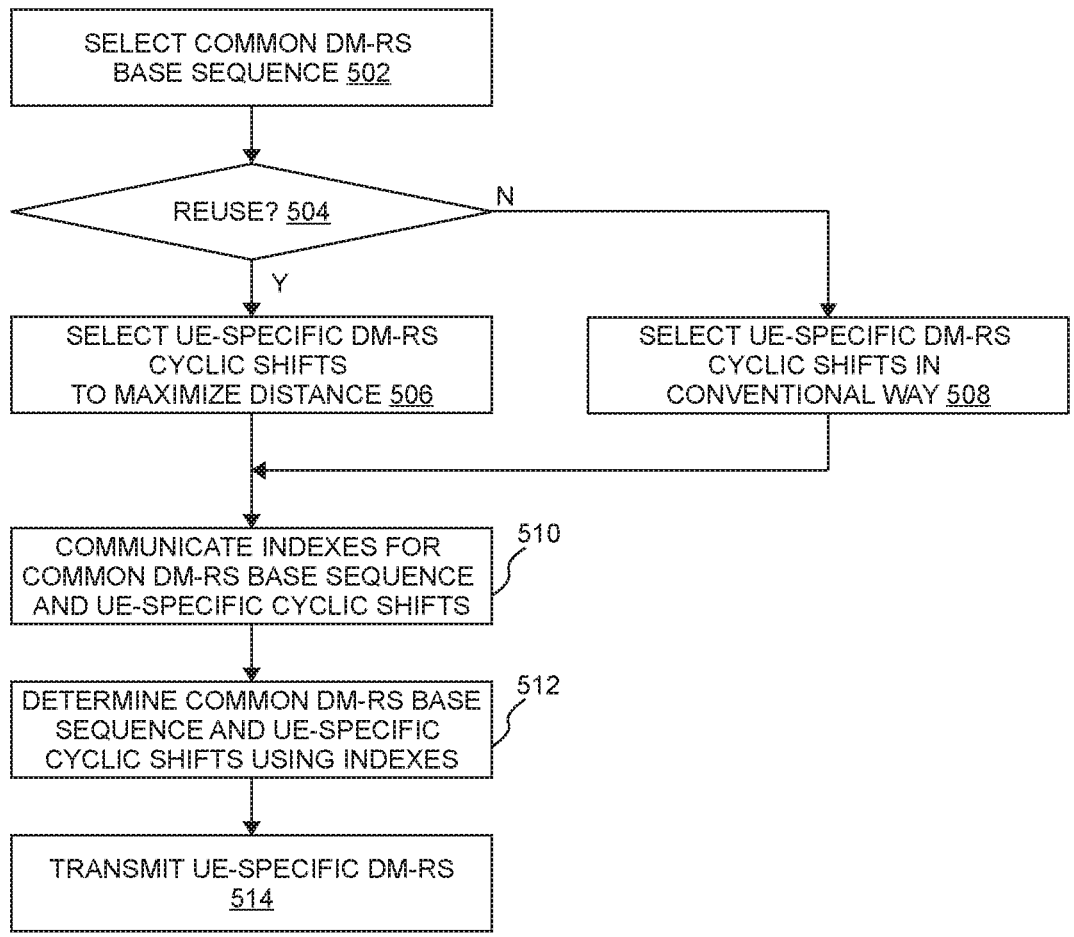

FIG. 5 comprises a flow chart illustrating one exemplary embodiment of a method of assigning demodulation reference signals (DM-RSs) to UEs that are put into PUSCH reuse in a C-RAN.

Figure 6:
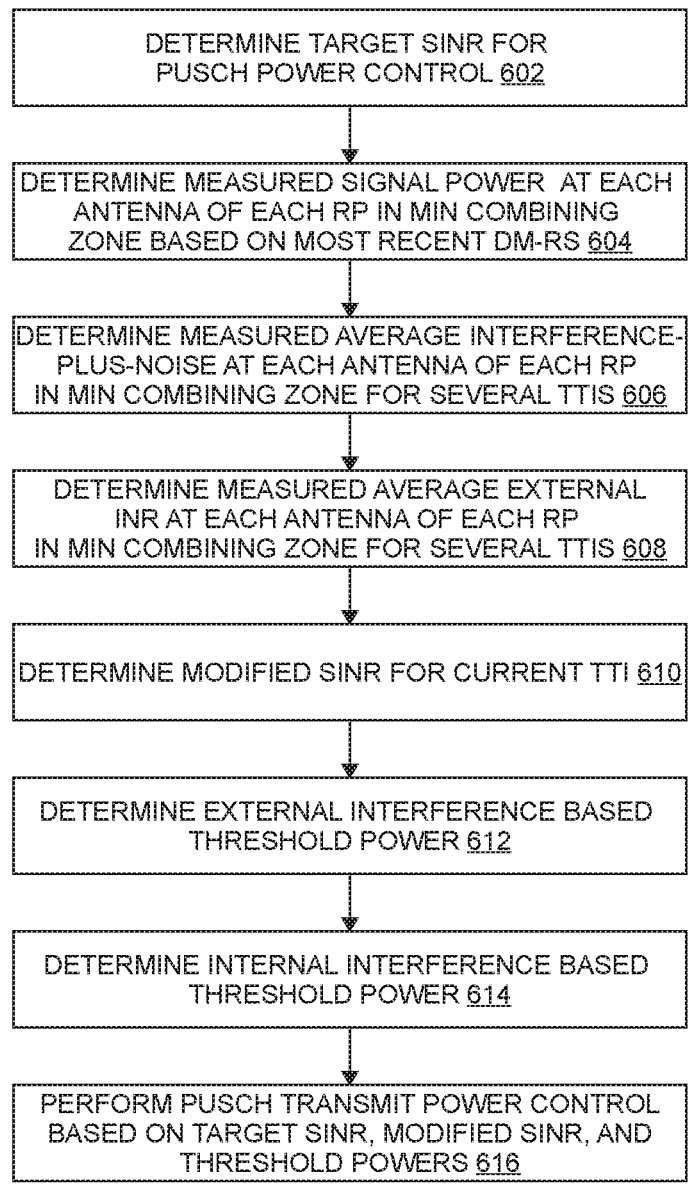

FIG. 6 comprises a flow chart illustrating one exemplary embodiment of a method of controlling the PUSCH transmit power of a UE in a C-RAN.

Figure 7:
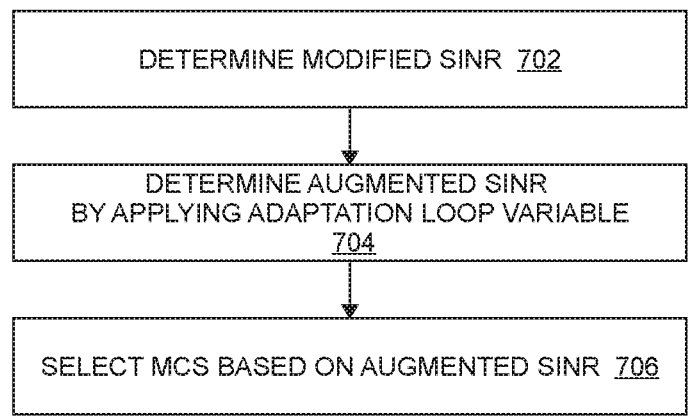

FIG. 7 comprises a flow chart illustrating one exemplary embodiment of a method of PUSCH link adaption for a UE in a C-RAN.

Like reference numbers and designations in the various drawings indicate like elements.

DETAILED DESCRIPTION

FIG. 1 is a block diagram illustrating one exemplary embodiment of a radio access network (RAN) system 100 in which the dynamic reuse techniques described here can be implemented. The system 100 is deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 1, the system 100 is implemented at least in part using a C-RAN (point-to-multipoint distributed base station) architecture that employs at least one baseband unit 104 and multiple radio points (RPs) 106 serve at least one cell 103. The system 100 is also referred to here as a "C-RAN system" 100. The baseband units 104 are also referred to here as "baseband controllers" 104 or just "controllers" 104. Each RP 106 includes or is coupled to one or more antennas 108 via which downlink RF signals are radiated to user equipment (UE) 110 and via which uplink RF signals transmitted by UEs 110 are received.

More specifically, in the example shown in FIG. 1, each RP 106 comprises two antennas 108. Each RP 106 can include or be coupled to a different number of antennas 108.

The system 100 is coupled to the core network 112 of each wireless network operator over an appropriate back-haul. In the exemplary embodiment shown in FIG. 1, the Internet 114 is used for back-haul between the system 100 and each core network 112. However, it is to be understood that the back-haul can be implemented in other ways.

The exemplary embodiment of the system 100 shown in FIG. 1 is described here as being implemented as a Long Term Evolution (LTE) radio access network providing wireless service using an LTE air interface. LTE is a standard developed by 3GPP standards organization. In this embodiment, the controller 104 and RPs 106 together are used to implement an LTE Evolved Node B (also referred to here as an "eNodeB" or "eNB") that is used to provide user equipment 110 with mobile access to the wireless network operator's core network 112 to enable the user equipment 110 to wirelessly communicate data and voice (using, for example, Voice over LTE (VoLTE) technology).

Also, in this exemplary LTE embodiment, each core network 112 is implemented as an Evolved Packet Core (EPC) 112 comprising standard LTE EPC network elements such as, for example, a mobility management entity (MME) (not shown) and a Serving Gateway (SGW) (not shown) and, optionally, a Home eNodeB gateway (HeNB GW) (not shown) and a Security Gateway (SeGW) (not shown).

Moreover, in this exemplary embodiment, each controller 104 communicates with the MME and SGW in the EPC core network 112 using the LTE S1 interface and communicates with other eNodeBs using the LTE X2 interface. For example, the controller 104 can communicate with an outdoor macro eNodeB (not shown) via the LTE X2 interface.

Each controller 104 and the radio points 106 can be implemented so as to use an air interface that supports one or more of frequency-division duplexing (FDD) and/or time-division duplexing (TDD). Also, the controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controller 104 and the radio points 106 can implement one or more of the LTE transmission modes. Moreover, the controller 104 and/or the radio points 106 can be configured to support multiple air interfaces and/or to support multiple wireless operators.

In the exemplary embodiment shown in FIG. 1, the front-haul that communicatively couples each controller 104 to the one or more RPs 106 is implemented using a standard ETHERNET network 116. However, it is to be understood that the front-haul between the controllers 104 and RPs 106 can be implemented in other ways.

Generally, one or more nodes in a C-RAN perform analog radio frequency (RF) functions for the air interface as well as digital Layer 1, Layer 2, and Layer 3 (of the Open Systems Interconnection (OSI) model) functions for the air interface.

In the exemplary embodiment shown in (L1) FIG. 1, each baseband controller 104 comprises Layer-3 (L3) functionality 120, Layer-2 (L2) functionality 122, and Layer-1 (L1) functionality 124 configured to perform at least some of the Layer-3 processing, Layer-2 processing, and Layer-1 processing, respectively, for the LTE air interface implemented by the RAN system 100, and each RP 106 includes (optionally) Layer-1 functionality (not shown) that implements any Layer-1 processing for the air interface that is not performed in the controller 104 and one or more radio frequency (RF) circuits (not shown) that implement the RF front-end functions for the air interface and the one or more antennas 108 associated with that RP 106.

Each baseband controller 104 can be configured to perform all of the digital Layer-3, Layer-2, and Layer-1 processing for the air interface, while the RPs 106 (specifically, the RF circuits) implement only the RF functions for the air interface and the antennas 108 associated with each RP 106. In that case, IQ data representing time-domain symbols for the air interface is communicated between the controller 104 and the RPs 106. Communicating such time-domain IQ data typically requires a relatively high data rate front haul. This approach (communicating time-domain IQ data over the front haul) is suitable for those implementations where the front-haul ETHERNET network 116 is able to deliver the required high data rate.

If the front-haul ETHERNET network 116 is not able to deliver the data rate needed to front haul time-domain IQ data (for example, where the front-haul is implemented using typical enterprise-grade ETHERNET networks), this issue can be addressed by communicating IQ data representing frequency-domain symbols for the air interface between the controllers 104 and the RPs 106. This frequency-domain IQ data represents the symbols in the frequency domain before the inverse fast Fourier transform (IFFT) is performed. The time-domain IQ data can be generated by quantizing the IQ data representing the frequency-domain symbols without guard band zeroes or any cyclic prefix and communicating the resulting compressed, quantized frequency-domain IQ data over the front-haul ETHERNET network 116. Additional details regarding this approach to communicating frequency-domain IQ data can be found in U.S. patent application Ser. No. 13/762,283, filed on Feb. 7, 2013, and titled "RADIO ACCESS NETWORKS," which is hereby incorporated herein by reference.

Where frequency-domain IQ data is front-hauled between the controllers 104 and the RPs 106, each baseband controller 104 can be configured to perform all or some of the digital Layer-3, Layer-2, and Layer-1 processing for the air interface. In this case, the Layer-1 functions in each RP 106 can be configured to implement the digital Layer-1 processing for the air interface that is not performed in the controller 104. For example, in this exemplary embodiment, each controller 104 implements a receiver 105 and a scheduler 107 for the cell 103.

Where the front-haul ETHERNET network 116 is not able to deliver the data rate need to front haul (uncompressed) time-domain IQ data, the time-domain IQ data can be compressed prior to being communicated over the ETHERNET network 116, thereby reducing the data rate needed communicate such IQ data over the ETHERNET network 116.

Data can be front-hauled between the controllers 104 and RPs 106 in other ways (for example, using front-haul interfaces and techniques specified in the Common Public Radio Interface (CPRI) and/or Open Base Station Architecture Initiative (OBSAI) family of specifications).

Each controller 104 and RP 106 (and the functionality described as being included therein) can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106 can be implemented in other ways.

In the exemplary embodiment shown in FIG. 1, a management system 118 is communicatively coupled to the controllers 104 and RPs 106, for example, via the Internet 114 and ETHERNET network 116 (in the case of the RPs 106).

In the exemplary embodiment shown in FIG. 1, the management system 118 communicates with the various elements of the system 100 using the Internet 114 and the ETHERNET network 116. Also, in some implementations, the management system 118 sends and receives management communications to and from the controllers 104, each of which in turn forwards relevant management communications to and from the RPs 106.

As noted above, "uplink reuse" refers to situations where separate uplink data is simultaneously transmitted from for two (or more) different UEs 110 over the Physical Uplink Shared Channel (PUSCH) using the same resource elements. Typically, these situations will arise when the UEs 110 are sufficiently physically separated from each other so that the different uplink transmissions do not interfere with each other when transmitted from the different UEs 110. Also, as noted above, this type of reuse is also referred to as "spatial uplink reuse."

In this exemplary embodiment, each controller 104 implements an interference-rejection combining (IRC) receiver 105 for the PUSCH. In the following description, each UE 110 served by the controller 104 has an associated "combining zone." The combining zone of a UE 110 is the set of RPs 106 that forward received PUSCH Layer-1 data for that UE 110 to the associated controller 104, where the PUSCH IRC receiver 105 implemented by that controller 104 for that UE 110 combines the Layer-1 data to detect the Transport Blocks (TBs) transmitted by that UE 110. In one implementation, the PUSCH Layer-1 data comprises quantized frequency-domain PUSCH IQ samples.

Increasing the combining zone increases the received signal power for the UE 110, provides greater macro diversity against small-scale fading, and greater protection against interference (from UEs 110 that are in uplink reuse with that UE 110 or UEs that are connected to a different cell), and reduces the frequency of connection drops due to movement of the UEs 110. However, a larger combining zone also proportionally increases the required front-haul (Ethernet) link capacity between switches of the front-haul network 116 and at the controller 104 and increases the processing load in the controller 104. Therefore, it is desirable that the combining zone of each UE 110 be chosen to achieve a good trade-off between performance, front-haul link utilization, and controller processing load.

The "current" combining zone for each UE 110 is the combining zone that is currently being used by the PUSCH IRC receiver 105 for that UE 110. For each UE 110, there is a configurable minimum number of RPs 106 that should be in the combining zone for that UE 110 (for example, one RP 106) and the corresponding combining zone is referred to here as the "minimum combining zone" for that UE 110. Likewise, for each UE 110, there is a configurable maximum number of RPs 106 permitted in the combining zone for that UE 110 (for example, two or three RPs 106) and the corresponding combining zone is referred to here as the "maximum combining zone" for that UE 110.

In the exemplary embodiment described here in connection with FIG. 1, the combining zone for each UE 110 is determined by the serving controller 104 using a "signature vector" (SV) associated with that UE 110. In this embodiment, a signature vector is determined for each UE 110. The signature vector is determined based on receive power measurements made at each of the RPs 106 serving the cell 103 for uplink transmissions from the UE 110.

When a UE 110 makes initial LTE Physical Random Access Channel (PRACH) transmissions to access the cell 103, each RP 106 will receive those initial PRACH transmissions and a signal reception metric indicative of the power level of the PRACH transmissions received by that RP 106 is measured (or otherwise determined). One example of such a signal reception metric is a signal-to-noise plus interference ratio (SNIR). The signal reception metrics that are determined based on the PRACH transmissions are also referred to here as "PRACH metrics."

Each signature vector is determined and updated over the course of that UE's connection to the cell 103 based on Sounding Reference Signals (SRS) transmitted by the UE 110. A signal reception metric indicative of the power level of the SRS transmissions received by the RPs 106 (for example, a SNIR) is measured (or otherwise determined). The signal reception metrics that are determined based on the SRS transmissions are also referred to here as "SRS metrics."

Each signature vector is a set of floating point signal-to-interference-plus-noise ratio (SINR) values (or other metric), with each value or element corresponding to a RP 106 used to serve the cell 103.

The signature vector can be used to determine the RP 106 having the best signal reception metric by scanning or sorting the elements of the signature vector to find the element having the best signal reception metric. The RP 106 that corresponds to that "best" element is also referred to here as the "primary RP 106" for the UE 110.

The minimum combining zone for a UE 110 contains those RPs 106 having the best signal reception metrics in the current SV for that UE 110, where the number of those RPs 106 is equal to the configurable minimum number of RPs 106 for the minimum combining zone for that UE 110. For example, where the minimum number of RPs 106 is equal to one, the minimum combining zone for a UE 110 contains only the primary RP 106 for that UE 110 (that is, the RP 106 having the best signal reception metric in the current SV for that UE 110). Likewise, the maximum combining zone for a UE 110 contains those RPs 106 having the best signal reception metrics in the current SV for that UE 110, where the number of those RPs 106 is equal to the configurable maximum number of RPs 106 for the maximum combining zone for that UE 110. For example, where the maximum number of RPs 106 is equal to three, the maximum combining zone for a UE 110 contains only the three RPs 106 having three best signal reception metrics in the current SV for that UE 110.

As used herein, a "quantized signature vector" (QSV) for a given UE 110 of interest is a vector that includes an element for each RP 106, where each element has one of a finite set of values.

In this exemplary embodiment, the "signal zone" for each UE 110 is the maximum combining zone—that is, the combining zone for that UE 110 that includes the maximum number of RPs 106 having the best SV signal reception metrics for that UE 110. All the other RPs 106 not in the signal zone for the UE 110 are also referred to here as being in the "interference zone" of the UE 110.

FIG. 2 comprises a flow chart illustrating one exemplary embodiment of a method 200 of determining a minimum combining zone, a maximum combining zone, and a current combining zone for a UE in a C-RAN. The embodiment of method 200 shown in FIG. 2 is described here as being implemented in the C-RAN system 100 of FIG. 1, though it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner).

Method 200 is described here as being performed for each UE 110 connected to the cell 103 if the system is configured to allow uplink reuse. Also, method 200 is performed when called for in the lifecycle of a UE's connection as described below in connection with FIG. 3. The particular UE 110 for which method 200 is being performed is referred to here as the "current" UE 110.

Method 200 is performed using the signature vector SV for the current UE 110, which is sorted to create an ordered list of RPs 106. The RPs 106 are sorted from the RP 106 having the best signal reception metric for the UE 110 to the RP 106 having the worst signal reception metric for the UE 110. Method 200 is also performed using the "current prospective average RP load vector" L for cell 103. The current prospective average RP load vector L for the cell 103 is a $N_{rp} \times 1$ vector, where the jth element of the vector $\overline{L}_j$ is a weighted average number of resource blocks allocated for UEs 110 having that $RP_j$ in their minimum combining zone or their signal zone averaged over the N most recent transmission time intervals (TTIs). Each such weighted average is determined before the prospective load contribution due to the UE 110 of interest is added and where the previous load contribution due to the UE 110 of interest is removed and where $N_{rp}$ is the number RPs 106 serving that cell 103.

For a given UE 110, a candidate zone p' is the set containing the indices for the J RPs 106 having the J best signal reception metrics in the current signature vector for that UE 110, or equivalently, $$\rho^J = \arg\max_{\{\rho:|\rho|=J\}} \sum_{j\in\rho} sv_{u,j}$$

where $1 \leq J \leq N_{rp}$. That is, there are $N_{rp}$ candidate zones $\rho^J$ for a UE 110.

Method 200 comprises determining the minimum combining zone for the current UE 110 (block 202). In this exemplary embodiment, the minimum combining zone for the current UE 110 is determined by selecting the smallest candidate zone $\rho^J$ (that is, the candidate zone with the minimum size J) for which:

$$10 \log_{10}(\Sigma_{j \in \rho^J} sv_{u,j}/\Sigma_j sv_{u,j}) \geq \gamma$$

where $\gamma$ is a configurable minimum combining zone threshold value and J is capped by a configurable maximum minimum combing zone value. In one exemplary embodiment, $\gamma$ is selected from the set $\{1 \text{ dB}, 2 \text{ dB}, 3 \text{ dB}\}$ and the value of J is capped so that it may not exceed 3 RPs 106.

Method 200 further comprises determining a provisional signal zone for the current UE 110 (block 204). In this exemplary embodiment, the provisional signal zone for the current UE 110 is determined based on the current prospective average RP load vector L for the serving cell 103. The provisional signal zone is selected as the candidate zone $\rho^J$ having the largest J for which no RP 106 would have a resulting load greater than a configurable maximum load $L_{max}$. That is, the candidate zone $\rho^J$ where $$J^{\char`\^} = \max\{J : \bar{L}_j \geq L_{max} \forall j \in \rho^J\}$$

where $\bar{L}_j$ in the above expression is the weighted average described above.

Method 200 further comprises determining a minimum signal zone and a maximum signal zone for the current UE 110 (blocks 206 and 208). In this exemplary embodiment, the minimum signal zone is determined in order to provide isolation between reuse partners and is determined by selecting the candidate zone $\rho^J$ having the smallest J such the following is satisfied:

$$10 \log(sv_{u,1}/sv_{u,J_{min}}) > \beta_{min} \text{ dB}$$

where $\beta_{min}$ is a configurable minimum size threshold (for example, 15-20 dB). This resulting minimum signal zone has a size $J_{min}$ and is also referred to simply as "$J_{min}$."

In this exemplary embodiment, the maximum signal zone is determined in order to try to avoid scenarios where uplink reuse becomes disallowed due to some loading scenarios and is determined by selecting the candidate zone having the smallest J (referred to here as "$J_{max}$") that is equal to either (1) a configurable maximum value; or (2) the smallest $J_{max}$ that satisfies the following:

$$10 \log(sv_{u,1}/sv_{u,J_{max}}) > \beta_{max} \text{ dB}$$

where $\beta_{max}$ is a configurable maximum size threshold (for example, 30-40 dB). This resulting maximum signal zone has a size $J_{max}$ and is also referred to simply as "$J_{max}$".

Method 200 further comprises determining the current combining zone as a function of the provisional signal zone, the minimum signal zone, and the maximum signal zone (block 210). This resulting current combining zone has a size J* and is also referred to simply as "J*." In this exemplary embodiment, the current combing zone J* is determined by selecting the smaller of either the maximum signal zone $J_{max}$ or the larger of the minimum signal zone $J_{min}$ or the provisional signal zone $J^{\char`\^}$. That is, the current combining zone J* is:

$$J^* = \min\{J_{max}, \max\{J_{min}, J^{\char`\^}\}\}$$

That is the current combining zone J* is selected by bounding the provisional signal zone $J^{\char`\^}$ with a minimum signal zone $J_{min}$ and a maximum signal zone $J_{max}$.

FIG. 3 comprises a flow chart illustrating one exemplary embodiment of a method 300 of dynamically managing a minimum combining zone, a maximum combining zone, and a current combining zone for a UE over the course of a connection to a C-RAN. The embodiment of method 300 shown in FIG. 3 is described here as being implemented in the C-RAN system 100 of FIG. 1, though it is to be understood that other embodiments can be implemented in other ways.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner).

Method 300 is described here as being performed for each UE 110 when it attaches to the cell 103 and establishes an RRC connection. The particular UE 110 for which method 300 is being performed is referred to here as the "current" UE 110.

In this exemplary embodiment, at the end of each RRC connection by a given UE 110 with the serving cell 103, the current signature vector (SV) for that current UE 110 is stored for possible use with the UE's next RRC connection.

When the current UE 110 establishes a new RRC connection with the cell 103 (block 302), a signal reception metric (such as the SINR) is determined from the associated PRACH transmissions at each RP 106 (block 304).

If the serving controller 104 has a stored SV for the current UE 110 and there is a sufficient match between the stored SV and the determined PRACH metrics (block 306), the current SV is initialized using the stored SV (block 308) and the minimum combining zone, maximum combining zone, and current combining zone are determined using the current SV as described above in connection with FIG. 2 (block 310).

For example, the current UE's SAE-Temporary Mobile Subscriber Identity (S-TMSI) can be used to check if there is a stored SV for the current UE 110 and retrieve that stored SV if there is one.

In one implementation, a stored SV for the current UE 110 is sorted in descending order, where $SV_j$ denotes the jth element of the current UE's stored SV and $RP_j$ denotes the RP 106 corresponding to the jth element of the current UE's stored SV. In this implementation, the serving controller 104 determines that there is a sufficient match between the stored SV and the PRACH metrics if all of the following are true:

(A) The elapsed time since the last update of the stored SV during the current UE's previous RRC connection is less than a configurable setting (referred to here as "StoredSvMaxAge");

(B) The PRACH transmission is detected by the primary RP 106 of the stored SV (for example, the PRACH signal reception metric for the primary RP 106 is above a predetermined threshold);

(C) The PRACH transmission is detected by the RP 106 having the next best reception metric in the stored SV (the "second" RP 106), if the difference between the reception metric for the primary RP 106 and the reception metric for the second RP 106 is less than a configurable value (referred to here as "deltaSvForPrachMatch"); and (D) When at least two RPs 106 detect the PRACH transmission, the two RPs 106 with the highest PRACH reception metric must be among the RPs 106 having the top three reception metrics in the stored SV.

If these conditions are all true, it is determined that there is a sufficient match between the stored SV and the PRACH metrics and the current SV is initialized using the stored SV.

If the serving controller 104 does not have a stored signature vector (SV) for the current UE 110 or if there is not a sufficient match between the stored SV and the determined PRACH metrics, then the minimum combining zone, maximum combining zone, and current combining zone are determined using the PRACH signal reception metrics (block 312). In this exemplary embodiment, this done by setting the minimum combining zone and the maximum combining zone to include all RPs 106 used to serve the cell 103 and setting the current combining zone to the set of RPs 106 that received the PRACH transmission subject to a configurable maximum number and where the RPs 106 with the best signal reception metric are used if more than the configurable maximum number of RPs 106 received the PRACH transmission.

Then, the minimum combining zone, maximum combining zone, and current combining zone are updated when the first SRS transmission is received for the current UE 110 (block 314). More specifically, the current signature vector for the current UE 110 is updated based on the first SRS transmission and then the updated current signature vector is used to determine the minimum combining zone, maximum combining zone, and current combining zone for the current 110 as described above in connection with FIG. 2.

After the first SRS transmission is received for the current UE 110, the minimum combining zone, maximum combining zone, and current combining zone are updated periodically (block 316). More specifically, each time a configurable number of SRS transmissions have been received for the current UE 110 since the last update, the current signature vector is used to determine the minimum combining zone, maximum combining zone, and current combining zone for the current 110 as described above in connection with FIG. 2.

FIG. 4 comprises a flow chart illustrating one exemplary embodiment of a method 400 of scheduling UEs 110 that are put into uplink reuse in a C-RAN. The embodiment of method 400 shown in FIG. 4 is described here as being implemented in the C-RAN system 100 of FIG. 1, though it is to be understood that other embodiments can be implemented in other ways.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner).

Method 400 comprises, during scheduling the PUSCH for a given a transmission time interval (TTI), identifying groups of UEs 110 that can be put into uplink reuse (block 402). In this exemplary embodiment, two UEs 110 can put into uplink reuse if the minimum combining zone of the first UE 110 does not include any RPs 106 that are in the signal zone of the second UE 110 and if the minimum combining zone of the second UE 110 does not include any RPs 106 that are in the signal zone of the first UE 110. If these conditions are satisfied, the two UEs 110 are referred to here as being "mutually orthogonal" to each other.

Method 400 further comprises initially allocating PUSCH resource blocks for the current TTI assuming each scheduled UE 110 put into uplink reuse uses its respective minimum combining zone as its current combining zone (block 404).

Method 400 further comprises, after initial resource block allocation, attempting to expand the current combining zone for one or more of the UEs 110 put into reuse (block 406).

In this exemplary embodiment, for a given UE 110 that is put into uplink reuse, if any RP 106 in the minimum combining zone of any other UE 110 in uplink reuse with that given UE 110 is in the signal zone of that given UE 110, then the current combining zone for that given UE 110 is expanded to include any such RP 106. The signal zone for a UE 110 is determined as described above in connection with FIG. 2 and takes into account the ability of including a RP 106 to benefit that UE 110 while ensuring that there are sufficient processing resources to do so. This expansion of the current combining causes no additional demand on the fronthaul as the uplink data provided by any added RP 106 is already sent on the fronthaul as a result of being in the minimum combining zone of the other UE 110 in reuse.

Also, in this exemplary embodiment, if the total number of resource blocks allocated for the current TTI will result in less than the total available front-haul network capacity being used, then the current combining zone for one or more of the scheduled UEs 110 can be expanded in order to use the additional front-haul capacity. Various criteria can be used to select which UEs 110 should have their combining zones expanded in such situations, such as highest scheduling priority, largest individual SINR improvement, largest overall SINR improvement, etc. This expansion is temporary and occurs after the Layer 2 scheduling of the current TTI is performed. This expansion does not affect the ability of the UE 110 to be put in reuse in the current TTI or subsequent TTIs. The additional RPs 106 provided by the expansion of the combining zone are useful in Layer 1 combining where in general they improve the SINR at the output of the IRC combiner.

As a result of the processing associated with methods 200, 300, and 400, a unique minimum combining zone for each UE 110 is assigned and updated based on the current channel conditions experienced by that UE 110 (as reflected in the SV). This minimum combining zone can be used to efficiently determine situations where uplink spatial reuse can be used, while at the same time taking into account processing load at the RPs 106 and the front-haul link capacity. That is, uplink spatial reuse can be deployment more efficiently and intelligently.

FIG. 5 comprises a flow chart illustrating one exemplary embodiment of a method 500 of assigning demodulation reference signals (DM-RSs) to UEs 110 that are put into PUSCH reuse in a C-RAN. The embodiment of method 500 shown in FIG. 5 is described here as being implemented in the C-RAN system 100 of FIG. 1, though it is to be understood that other embodiments can be implemented in other ways.

The blocks of the flow diagram shown in FIG. 5 have been arranged in a generally sequential manner for ease of explanation; however, it is to be understood that this arrangement is merely exemplary, and it should be recognized that the processing associated with method 500 (and the blocks shown in FIG. 5) can occur in a different order (for example, where at least some of the processing associated with the blocks is performed in parallel and/or in an event-driven manner).

In LTE, for the PUSCH, the serving controller 104 assigns each UE 110 a DM-RS resource during scheduling. The UE 110 transmits the DM-RS in the fourth OFDM symbol of each slot in the RBs allocated to it. The IRC receiver 105 in the serving controller 104 uses the DM-RS assigned to the UE 110 to estimate the frequency-domain channel response.

In general, the DM-RS resource assigned to each UE 110 is determined by multiplying a common DM-RS base sequence by a DM-RS cyclic shift. When multiple UEs 110 are put into uplink PUSCH reuse and are assigned the same RB, it is desirable to minimize interference between the DM-RSs sent by the UEs 110 since such interference may raise the channel estimation error, which in turn can degrade the SINR seen by the IRC receiver 105. Method 500 is configured to minimize interference between the DM-RSs sent by UEs 110 put into PUSCH reuse.

Method 500 comprises the serving controller 104, as a part of scheduling the PUSCH, selecting a common DM-RS base sequence used by all scheduled UEs 110 (block 502) and, for any UEs 110 that are put into PUSCH reuse with each other (checked in block 504), selecting different UE-specific DM-RS cyclic shifts for those UEs 110 that maximize the distance between the selected different UE-specific DM-RS cyclic shifts (block 506). The UE-specific DM-RS cyclic shifts for UEs 110 that are not put into uplink PUSCH reuse are selected in the conventional way (block 508).

Appropriate indexes for the selected common DM-RS base sequence and UE-specific cyclic shifts are communicated to each UE 110 (in a Downlink Control Information (DCI) 0 message in this example) (block 510). Each UE 110 uses the indexes communicated to it to determine the selected common DM-RS base sequence and UE-specific cyclic shifts and determine the assigned UE-specific DM-RS by multiplying the common DM-RS base sequence with the UE-specific DM-RS cyclic shift (block 512). Each UE 110 transmits its UE-specific DM-RS in the fourth OFDM symbol of each slot in the RBs allocated to it (block 514). The IRC receiver 105 in the controller 104 uses the UE-specific DM-RS to estimate the frequency-domain channel response.

To ensure the orthogonality of DM-RSs, the RB allocations of the UEs 110 that have been put into uplink PUSCH may be perfectly aligned (that is, the UEs 110 that are in reuse with each other only transmit on the PUSCH during exactly the same RBs).

In the exemplary embodiment described here, the PUSCH DM-RS used by each UE 110 is derived from a single common DM-RS base sequence $r_{u,v}(n)$ by multiplying it by a phase shift sequence $e^{j\alpha n}$, where $\alpha$ is a cyclic shift parameter defined below. In this embodiment, the index n goes from 0 to 12M−1, where M is the number of RBs assigned to the UE 110 and each value of n corresponds to 1 Resource Element (RE).

In this embodiment, where uplink PUSCH reuse is used without frequency hopping, for the single common DM-RS base sequence $r_{u,v}(n)$, v is equal to 0 and the controller 104 chooses one common DM-RS base sequence $r_{u,0}(n)$ among 30 possible base sequences, indicated by index u, for each uplink allocation length:

$u=(\text{Cell-ID}+\Delta_{ss})[\text{mod } 30]$, where $\Delta_{ss}$ is a cell-specific parameter between 0-29 signaled in a system information block (SIB) message. The base sequence is derived from a Zadoff-Chu sequence for greater than 2 RBs and uses different special sequences for 1 or 2 RBs.

When group hopping and sequence hopping are enabled, reference signals used in different cells can be varied between slots to prevent persistent interference conditions. Both hopping schemes are based on the Cell-ID and help randomize any interference between the C-RAN network 100 and any neighboring macro or small cell networks. Group hopping or sequence hopping will typically not be helpful in randomizing DM-RS interference between UEs in the C-RAN network 100.

The cyclic shift parameter $\alpha$ is defined as:

$\alpha=2\pi n_{CS}/12$.

where $n_{CS}$ is an integer between 0 and 11 given by:

$n_{CS}=n_{DMRS}(1)+n_{DMRS}(2)+n_{PRS}(n_s)(\text{mod } 12)$, where $n_{DMRS}(1)$ is a semi-static cell-specific value signaled in a SIB message and $n_{PRS}(n_s)$ is a cell-specific per-slot hopping pattern that depends on the Cell-ID and the parameter $\Delta_{ss}$ described above. The parameter $n_{DMRS}(2)$ is a user-specific value, that is chosen by the scheduler 107 in the controller 104, and is indicated in the DCI message sent to the UE 110 for uplink resource allocation. In one implementation, the values of $n_{DMRS}(1)$ and $n_{DMRS}(2)$ are chosen from the set {0, 2, 3, 4, 6, 8, 9, 10}, where the values of 1, 5, 7 and 11 are not supported. In non-adaptive retransmissions, the UE 110 uses the same cyclic shift value as in the first transmission.

By assigning different UEs 110 in reuse different values of $n_{DMRS}(2)$, the scheduler 107 in the controller 104 will ensure that UEs 110 in reuse will never use the same DM-RS cyclic shift. Therefore, UEs 110 in PUSCH reuse should avoid the bias interference problem that tends to occur with downlink PDSCH reuse, as long as UEs 110 sharing the same allocation of RBs use different DM-RS cyclic shifts.

When two UEs 110 are assigned different DM-RS sequences in the same cell 103 and use exactly the same set of RBs, there will be no mutual interference between these DM-RS sequences if the following conditions are all met:

(A) The channel response seen by the UEs 110 is flat within a RB;

(B) There is no significant time-delay between the arrivals of the two UE's 110 signals at the RPs 106;

(C) The UEs are assigned different UE-specific cyclic shift indices $n_{DMRS}(2)$.

When the UEs 110 are perfectly synchronized to the downlink with timing advance chosen for perfect alignment at the closest RPs 106, there could be a time delay of 1 microsecond for every propagation distance difference of 300 meters. This is still a very small fraction of the symbol time and should not significantly impact orthogonality.

To minimize the possibility of interference due to frequency selectivity within a RB, two UEs 110 in uplink PUSCH reuse should be assigned $n_{DMRS}(2)$ values in the pair set {(0, 6), (2, 8), (3, 9), (4, 10)}. This maximizes the distance between "cyclic shifts" used by the two UEs 110 and reduces susceptibility to interference. Similarly, in four-way reuse, using the values in the set {(0, 3, 6, 9)} minimizes mutual interference. In one implementation of the embodiment, $n_{DMRS}(2)$ values of {0, 6, 3, 9} are used.

Since UEs have different data demand and possibly different link-adapted rates, forcing them to use the same number of RBs will lead to inefficiencies. Therefore, in one embodiment, RB alignment between UEs 110 in uplink PUSCH reuse is not required. When the DM-RS used by the desired and interfering UEs 110 are not orthogonal, there can be some leakage which will contribute some additional estimation error, however, simulations have shown that such errors do not have a significant impact on the IRC receiver 105 performance, especially when the cross-correlation between the DM-RS is low. Correlation between DM-RS varies depending on many factors, including the RB allocation, and can sometimes be high, but on average the impact of DM-RS non-orthogonality on the IRC receiver 105 performance is expected to be small.

When uplink PUSCH reuse is used, since the controller 104 knows the DM-RS of the interfering UEs 110, it can jointly estimate the desired UE's 110 and the interferer UE's 110 channel responses in the combining zone of the desired UE 110.

FIG. 6 comprises a flow chart illustrating one exemplary embodiment of a method 600 of controlling the PUSCH transmit power of a UE 110 in a C-RAN. The embodiment of method 600 shown in FIG. 6 is described here as being implemented in the C-RAN system 100 of FIG. 1, though it is to be understood that other embodiments can be implemented in other ways.

The blocks of the flow diagram shown in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order (for example, where at least some of the processing associated with the blocks is performed in parallel and/or in an event-driven manner).

Method 600 is described here as being performed for each UE 110 connected to the cell 103 if the system is configured to allow uplink reuse. The particular UE 110 for which method 600 is being performed is referred to here as the "current" UE 110.

In this embodiment, the transmit power of the current UE 110 is set independent of the UE rate. In other words, the parameter deltaMCS, which is used in closed-loop power control, is disabled. Instead, the UE rate is adjusted through link adaptation.

Method 600 comprises determining, for the current UE 110, a target SINR to be used with PUSCH power control (block 602). The target SINR is selected based on the power head room reported for the current UE 110. The primary purpose of transmit power control is to compensate for differences in channel gain experienced by different UEs 110, taking into account each UE's Power Head-Room (PHR). In the absence of any interference, the PUSCH closed-loop power control would adapt a UE's transmit power level to achieve a target signal-to-interference-plus-noise ratio (SINR). To achieve a given target SINR, an UE 110 near an RP 106 will generally transmit at a much lower power compared to an UE 110 that is away from the RP 106 (multi-RP combining will tend to reduce this effect somewhat). When the path loss experienced by a UE 110 is large, it will be limited in the number of RBs it can transmit within its transmit power limit. This will limit the UE's achievable throughput. For such UEs 110, achievable throughput can be increased by reducing the power control target SINR. So, the method 600 uses a different target SINR for each UE 110, and this target SINR is adapted based on UE's reported power headroom.

The initial target SINR for the PUSCH power control is set to provide a signal-to-noise ratio that is sufficient to achieve the targeted initial modulation and coding scheme (MCS) (for example, the maximum MCS). This setting is done using knowledge of the RP's receiver noise figure.

Method 600 further comprises determining the measured signal power for the current UE 110 at each antenna 108 of each RP 106 in the current UE's minimum combining zone based on the most recent PUSCH DM-RS (block 604). This is done on a per-UE basis. That is, for the current UE k, the signal power at each antenna m of each RP x in the current UE's minimum combining zone is computed for each RB scheduled for the current UE k from the corresponding DM-RS sequence, and the resulting signal powers for all scheduled RBs are summed and then normalized to 1 PRB, where the resulting measured signal power for the current UE k at each antenna m of each RP x in the current UE's minimum combining zone is denoted as the following: (where t is the current TTI):

$$\hat{S}_{x,m,k}(t)$$

This computation is done for the RBs that are scheduled for the current UE 110.

Method 600 further comprises determining the measured average interference-plus-noise at each antenna 108 of each RP 106 in the current UE's minimum combining zone for several TTIs (block 606). As used here, "used RBs" for a given RP 106 refer to all RBs that are scheduled to be used by any UE 110 that includes that RP 106 in its minimum combining zone, not just the current UE 110. Any interference that is determined for such used RBs is indicative of "total" interference—that is, both "external" interference, which is interference resulting from transmission from external UEs that are connected to other cells, and "internal" interference (also referred to here as "reuse" interference), which is interference resulting from UEs 110 that are also connected to the serving cell 103 and that are in reuse during that RB.

For this measured average interference-plus-noise determination, the interference-plus-noise power at each antenna m of each RP x in the minimum combining zone of the current UE k is computed for all used RBs for that RP x, and the resulting signal powers for all used RBs are summed and then normalized to 1 PRB. This can be represented as follows. Let $I_{x,m,k}(t)$ represent the interference-plus-noise estimate for UE k at antenna m of RP x for TTI t, where the interference-plus-noise estimate is determined from the diagonal term of the pre-IRC interference matrix. Then, the average total-interference-plus-noise estimate for all used RBs for TTI t at antenna m of RP x is represented by:

$$I_{x,m}(t) = \text{sum}(I_{x,m,k}(t))/\text{sum}(N_k)$$

where $I_{x,m,k}(t)$ is summed across all UEs k that include that RP x in their minimum combining zones, where $N_k$ is the number of RBs scheduled for each such UE k, and $N_k$ is summed across all UEs k that include that RP x in their minimum combining zones. If there are no used RBs in given TTI t at a given antenna m of an RP x, then the average external interference power estimate $\bar{I}_{0,x,m}(t)$ for that TTI t is used instead. Then, the average of the total interference-plus-noise at antenna m of RP x for TTI t across all used RBs, normalized per 1 PRB, is computed as a moving average as follows:

$$I_{x,m}(t) = \alpha \bar{I}_{x,m}(t-1) + (1-\alpha)I_{x,m}(t)$$

where α a configurable smoothing factor.

Method 600 further comprises determining the measured average external-interference-plus-noise (INR) at each antenna 108 of each RP 106 in the current UE's minimum combining zone for several TTIs (block 608). As used here, "unused RBs" refer to all RBs that are not scheduled to be used by any UE 110. Any interference that is measured for such unused RBs is indicative of external interference. In one embodiment, the scheduler 107 in the serving controller 104 is configured so that at least some subframes include unused RBs that can be used to determine the average external-interference-plus-noise determination at each RP 106. For this average external interference-plus-noise determination, the interference-plus-noise power at each antenna m of each RP x in the minimum combining zone of the current UE k is computed for all unused RBs, and the resulting signal powers for all used RBs are summed and then normalized to 1 PRB. The interference-plus-noise estimate can be determined from the diagonal term of the pre-IRC interference matrix and can be represented as $I_{0,x,m}(t)$. Then, the average of the external interference-plus-noise at antenna m of RP x for TTI t across all unused RBs, normalized to one PRB, is computed as a moving average as follows:

$$\bar{I}_{0,x,m}(t)=\alpha_2 \bar{I}_{0,x,m}(t-1)+(1-\alpha_2)I_{0,x,m}(t)$$

where $\alpha_2$ is a configurable smoothing factor.

Method 600 further comprises determining, for the current UE 110, a "modified" SINR for the current TTI (block 610). A "modified" signal-to-interference-plus-noise ratio (SINR) for the current UE 110 is computed at each antenna m for each RP x in the current UE's minimum combining zone Z(k) and the resulting modified SINR values are summed to get the final modified SINR for the current TTI t. That is, the modified SINR $Q_k(t)$ can be represented as follows:

$$Q_k(t) = \sum_{x \in Z(k)} \sum_{m=0}^{1} \frac{\hat{S}_{x,m,k}(t)}{\bar{I}_{x,m}(t)}$$

These SINR values are "modified" in the sense that signal part of the ratio is determined on a per-UE basis (that is, for the RBs scheduled for use with the current UE 110) whereas the interference-plus-noise of the ratio is determined for all used RBs (regardless of which UE 110 that is scheduled for use with each such RB).

Then, the average modified SINR for the current UE k is computed as a moving average as follows:

$$\bar{Q}_k(t)=\alpha_1 \bar{Q}_k(t-1)+(1-\alpha_1)Q_k(t)$$

where $\alpha_1$ is a configurable smoothing factor.

Method 600 further comprises determining, for the current UE 110, an external interference-based threshold power ThresholdPower1 (block 612).

The external interference-based threshold power ThresholdPower1 is used to suppress outgoing interference with external cells caused by transmissions from the current UE 110 and is computed whenever a new measurement report is received from the current UE 110. The current UE 110 is configured to send measurement reports (that include a reference signal received power (RSPR) measurement) for its serving cell 103 and for neighboring cells i. For example, such measurement reports can be based on event A3 where the following condition is true:

neighbor-cell RSRP−serving cell RSRP>Offset where Offset is a configurable offset. More than one measurement event can be configured (for example, one for each power class of neighboring cells).

The serving controller 104 uses the sniffing mechanism (that is, UE receiver mode) in the RPs 106 to periodically look for neighboring cells and decode their SIB1/SIB2 information. This provides the serving controller 104 with the transmit power (EPRE) $P_i$ of cell i. The pathgain $G_i$ between the current UE k and its neighbor cell i is then determined as $G_{k,i}=R_i/P_i$, where $R_i$ is the received power at the UE k for transmissions from the neighbor cell i as reflected in the RSRP measured by the UE k for that neighbor cell i and $P_i$ is the transmit power reported by the neighbor cell i in the decoded SIB1/SIB2 information. The transmit power required from the current UE k in order to generate an interference power PextinterfThreshold$_{k,i}$ at neighbor cell i at a configurable outgoing interference threshold OutgoingInterferenceThreshold is determined as:

PextinterfThreshold$_{k,i}$=OutgoingInterferenceThreshold/$G_{k,i}$

The lowest of all such power thresholds PextinterfThreshold$_{k,i}$ across all neighbor cells i is used as maximum power allowed for UE k, denoted as PextinterfThreshold$_k$ and is used as the external interference-based threshold power ThresholdPower1 for the current UE 110.

If there are no detected neighbor cells i, then the external interference-based threshold power ThresholdPower1 for the current UE 110 is set to the maximum UE transmit power.

Method 600 further comprises determining, for the current UE 110, an internal interference-based threshold power ThresholdPower2 (block 614).

The internal interference-based threshold power ThresholdPower2 is used to suppress interference with any other UE 110 in reuse that is caused by transmissions from the current UE 110. The internal interference-based threshold power ThresholdPower2 is computed whenever the minimum combing zone and signal zone for the current UE 110 is updated.

As noted above, the current UE 110 is configured to send measurement reports (that include the RSPR measurement) for its serving cell 103.

The pathgain $G_{k,s}$ between the current UE k and the serving cell s is then determined as $G_{k,s}=R_s/P_s$, where $R_s$ is the received power at the UE k from the serving cell s as reflected in the RSRP measured by the UE k and $P_s$ is the transmit power from the serving cell s for that UE k.

Then, the ratio so between the signature vector entry for each RP 106 that is not included in the minimum combining zone of the current UE k and the signature vector entry for the primary RP 106 for the current UE k. This ratio so is also equal to the pathloss gain $g_{k,o}$ between the current UE k and each RP 106 that is not included in the minimum combining zone of the current UE k and the pathloss gain $g_{k,p}$ between the current UE k and the primary RP 106 for the current UE k. That is, the ratio $s_o = g_{k,o}/g_{k,p}$.

Then, the transmit power required from the UE k in order to generate a combined interference power at all of the RPs that are not included in the minimum combining zone of the current UE k is given by:

PreuseinterfThreshold$_k$=ReuseInterferenceThreshold/($\Sigma_o G_{k,s} s_o$)

where ReuseInterferenceThreshold is a configurable internal reuse interference threshold. This PreuseinterfThreshold$_k$ is used as the internal interference-based threshold power ThresholdPower2 for the current UE k.

If the minimum combining zone for the current UE k includes all of the RPs 106 for the cell 103, then the maximum UE transmit power is used as the internal interference-based threshold power ThresholdPower2 for the current UE Method 600 further comprises performing PUSCH transmit power control for the current UE 110 using the determined target SINR and modified SINR for the current UE 110 while also using with the determined external and internal interference-based threshold powers ThresholdPower1 and ThresholdPower2 (block 616). Specifically, in this example, four power adjustment values are calculated. The first power adjustment value is:

$$\delta_{maxMCS\_SINR}(t) = SINR(max\ MCS) - Q_k(t)$$

where SINR(max MCS) is the determined target SINR and $Q_k(t)$ is the modified SINR for the current UE k for the current TTI t.

The second and third power adjustment values are:

$$\delta_{ext\_interference}(t) = ThresholdPower1, k - (Tx\ power/PRB)(k,t)$$

$$\delta_{reUse\_interference}(t) = ThresholdPower2, k - (Tx\ power/PRB)(k,t)$$

where (Tx power/PRB)(k,t) is the current transmit power for setting for the current UE k for the current TTI t.

The fourth power adjustment value is:

$$\delta_k(t) = \min\{\delta_{maxMCS\_SINR}(t), \delta_{ext\_interference}(t), \delta_{reUse\_interference}(t)\}$$

A provisional transmit power command (TPC) is determined as follows. If the fourth power adjustment value $\delta_k(t)$ is less than or equal to an upper hysteresis value–$Hyst_{upper}$, then the provisional TPC is set to −1 dB. Otherwise, if the fourth power adjustment value $\delta_k(t)$ is greater than the upper hysteresis value–$Hyst_{upper}$ and is greater than or equal to a lower hysteresis value $Hyst_{lower}$, then the provisional TPC is set to 0 dB (that is, there is no change). Otherwise, if the fourth power adjustment value $\delta_k(t)$ is less than the lower hysteresis value $Hyst_{lower}$, then the provisional TPC is set to +1 dB.

The provisional TPC is then subjected to other standard LTE PUSCH TPC command processing, where the result is applied as the PUSCH TPC command.

FIG. 7 comprises a flow chart illustrating one exemplary embodiment of a method 700 of PUSCH link adaption for a UE 110 in a C-RAN. The embodiment of method 700 shown in FIG. 7 is described here as being implemented in the C-RAN system 100 of FIG. 1, though it is to be understood that other embodiments can be implemented in other ways.

The blocks of the flow diagram shown in FIG. 7 have been arranged in a generally sequential manner for ease of explanation; however, it is to be understood that this arrangement is merely exemplary, and it should be recognized that the processing associated with method 700 (and the blocks shown in FIG. 7) can occur in a different order (for example, where at least some of the processing associated with the blocks is performed in parallel and/or in an event-driven manner).

Method 700 is described here as being performed for each UE 110 connected to the cell 103 if the system is configured to allow uplink reuse. The particular UE 110 for which method 700 is being performed is referred to here as the "current" UE 110.

Method 700 comprises determining the average modified SINR for the current UE 110 (block 702). The average modified SINR $\overline{Q}_k(t)$ can be calculated as described above in connection with block 610 of FIG. 6. If the combining zone for the current UE 110 is reduced for a particular TTI due to temporary reasons (for example, high loading in an RP 106), then a backoff can be applied to the average modified SINR.

Method 700 further comprises determining an augmented average SINR for the current UE 110 by applying an adaptation loop variable (block 704). The average modified SINR can be augmented by applying an adaptation loop variable $\theta_k(t)$ as follows:

$$\hat{Q}_k(t+1) = \overline{Q}_k(t) - \theta_k(t)$$

where the adaptation loop variable $\theta_k(t)$ is determined as follows:

$$\theta_k(t+1) = \begin{cases} \theta_k(t) + \Delta_{UP}, & CRC\ pass \\ \theta_k(t) - \Delta_{DN}, & CRC\ fail \end{cases}$$

and, where $\Delta_{UP}$ and $\Delta_{DN}$ are configurable upward and downward adjustment parameters, respectively. That is, when a new PUSCH transport block (TB) is received from the current UE 110 and decoded, if the TB passes the cyclic redundancy check (CRC), the adaptation loop variable is determined based on the previous value of the adaptation loop variable plus the upward adjustment parameter $\Delta_{UP}$. If the TB fails the CRC, the adaptation loop variable is determined based on the previous value of the adaptation loop variable minus the downward adjustment parameter $\Delta_{DN}$. The checking of the CRC is done in connection with processing acknowledgement or negative acknowledgement messages (ACK/NACK) for the TB.

Method 700 further comprises selecting a modulation and coding scheme (MCS) for the PUSCH data and uplink control information (UCI) transmitted by the current UE 100 during the next TTI based on the determined augmented average SINR (block 706).

Method 700 can be used to implement a relatively simple link adaptation mechanism where the UE rate is determined based on the average modified SINR determined for transmit power control. That is, link adaptation is performed for uplink transmissions from the current UE 110 by selecting a MCS for the current UE 110 based on a measured SINR for the current UE 110 and a sequence of acknowledgement and negative acknowledgement (ACK/NACK) messages associated with the uplink transmissions from that UE 110.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a system to provide wireless service comprising: a controller; and a plurality of radio points; wherein each of the radio points is associated with at least one antenna and remotely located from the controller, wherein the plurality of radio points is communicatively coupled to the controller; wherein the controller and the plurality of radio points are configured to implement a base station in order to provide wireless service to a plurality of user equipment (UEs) using a cell; wherein the controller is communicatively coupled to a core network of a wireless service provider; wherein the controller is configured to implement a scheduler to schedule uplink transmissions from the UEs; wherein the controller is configured to implement a combining receiver to receive uplink transmissions from each UE, the combining receiver configured to combine data indicative of the uplink transmissions from each UE as received at each radio point included in a combining zone assigned to that UE and communicated to the controller; wherein the controller is configured to assign, to each UE, a respective minimum combining zone comprising a respective minimum subset of the radio points for use as the combining zone of the combining receiver for receiving uplink transmission from that UE; wherein the controller is configured to assign, to each UE, a respective signal zone comprising a respective subset of the radio points that can be included in the combining zone of the combining receiver for receiving uplink transmission from that UE; wherein the scheduler is configured to determine if multiple UEs are able to make respective uplink transmissions during a respective same time-and-frequency resource based on the respective minimum combining zones and signal zones assigned to the UEs and allocate time-and-frequency resources to the UEs using the minimum combining zones assigned to the UEs; and wherein the scheduler is configured to, after allocating time-and-frequency resources to the UEs, attempt to expand the combining zones used for receiving uplink transmissions.

Example 2 includes the system of Example 1, wherein the controller is configured to assign to each UE a respective interference zone comprising a respective subset of the radio points that cannot be included in the combining zone of the combining receiver for receiving uplink transmission from that UE.

Example 3 includes the system of Example 2, wherein the scheduler is configured to determine if multiple UEs are able to make respective uplink transmissions during the same time-and-frequency resource based on the respective minimum combining zones assigned to the UEs by: determining if the minimum combining zone of a first UE does not include any radio points that are in the signal zone of a second UE and if the minimum combining zone of the second UE does not include any radio points that are in the signal zone of the first UE.

Example 4 includes the system of any of the Examples 2-3, wherein the scheduler is configured to attempt to expand the combining zones used for receiving uplink transmissions for any multiple UEs that are scheduled to make respective uplink transmissions during the same time-and-frequency resource by expanding the combining zone of a first of the multiple UEs to include one or more additional radio points.

Example 5 includes the system of Example 4, wherein the scheduler is configured to attempt to expand the combining zones used for receiving uplink transmissions for the multiple UEs by expanding the combining zone of the first of the multiple UEs to include any radio point in the minimum combining zone of a second of the multiple UEs that is in the signal zone of the first of the multiple UEs.

Example 6 includes the system of any of the Examples 2-5, wherein the controller is configured to assign the respective signal zone for each UE as a function of an ability of including each radio point in the respective combining zone of that UE to benefit the receiving of uplink transmissions from that UE.

Example 7 includes the system of any of the Examples 1-6, wherein the scheduler is configured to attempt to expand the combining zones used for receiving uplink transmissions for a transmission time interval (TTI) by expanding the combining zone of one or more of the UEs if less than a total front-haul capacity for communicating data between the one or more radio points and the controller is not being used for the TTI.

Example 8 includes the system of any of the Examples 1-7, wherein the controller is communicatively coupled to the radio points using a switched ETHERNET network.

Example 9 includes the system of any of the Examples 1-8, wherein the uplink transmissions comprise Physical Uplink Shared Channel (PUSCH) transmissions.

Example 10 the system of any of the Examples 1-9, wherein the scheduler is configured to, for any multiple UEs that are scheduled to make respective uplink transmissions during the same time-and-frequency resource, assign respective UE-specific demodulation reference signal (DM-RS) cyclic shifts to the multiple UEs, each of the UE-specific DM-RS cyclic shifts having an associated distance between that UE-specific DM-RS cyclic shift and each of the other UE-specific DM-RS cyclic shifts, wherein the DM-RS cyclic shifts are assigned to maximize the respective distances.

Example 11 includes the system of any of the Examples 1-10, wherein the controller is configured to perform transmit power control for the uplink transmissions from the UEs using a closed-loop UE-specific target SINR that is adapted for each UE based on a power headroom reported for that UE.

Example 12 includes the system of any of the Examples 1-11, wherein the controller is configured to perform transmit power control for the uplink transmissions from the UEs using a closed-loop UE-specific measured SINR that uses: a signal power measurement based on uplink transmissions from that UE; and an interference-plus-noise measurement based on uplink transmissions from all scheduled UEs.

Example 13 includes the system of any of the Examples 1-12, wherein the controller is configured to perform transmit power control for a UE as a function of external interference caused by the uplink transmissions from that UE and of internal interference caused by uplink transmission from that UE.

Example 14 includes the system of any of the Examples 1-13, wherein the scheduler is configured to perform link adaptation for uplink transmissions from the UEs by selecting a modulation and coding scheme (MCS) for each UE based on a measured signal-to-interference-plus-noise ratio (SINK) for the UE and a sequence of acknowledgement and negative acknowledgement (ACK/NACK) messages associated with the uplink transmissions from the UE.

Example 15 includes a system to provide wireless service comprising: a controller; and a plurality of radio points; wherein each of the radio points is associated with at least one antenna and remotely located from the controller, wherein the plurality of radio points is communicatively coupled to the controller; wherein the controller and the plurality of radio points are configured to implement a base station in order to provide wireless service to a plurality of user equipment (UEs) using a cell; wherein the controller is communicatively coupled to a core network of a wireless service provider; wherein the controller is configured to implement a scheduler to schedule uplink transmissions from the UEs; wherein the scheduler is configured to determine if multiple UEs are able to make respective uplink transmissions during a respective same time-and-frequency resource, and, for any multiple UEs that are able to make respective uplink transmissions during the respective same time-and-frequency resource, schedule said multiple UEs to make respective uplink transmissions during the respective same time-and-frequency resource and assign respective UE-specific demodulation reference signal (DM-RS) cyclic shifts to said multiple UEs; and wherein each of the UE-specific DM-RS cyclic shifts have an associated distance between that UE-specific DM-RS cyclic shift and each of the other UE-specific DM-RS cyclic shifts, wherein the DM-RS cyclic shifts are assigned to maximize the respective distances.

Example 16 includes the system of Example 15, wherein the controller is configured to implement a combining receiver to receive the uplink transmissions from each UE, the combining receiver configured to combine data indicative of the uplink transmissions from each UE as received at each radio point included in a combining zone assigned to that UE and communicated to the controller; wherein the controller is configured to assign, to each UE, a respective minimum combining zone comprising a respective minimum subset of the radio points for use as the combining zone of the combining receiver for receiving uplink transmissions from that UE; wherein the controller is configured to assign, to each UE, a respective signal zone comprising a respective subset of the radio points that can be included in the combining zone of the combining receiver for receiving uplink transmission from that UE; wherein the scheduler is configured to determine if multiple UEs are able to make respective uplink transmissions during a respective same time-and-frequency resource based on the respective minimum combining zones and signal zones assigned to the UEs; wherein the scheduler is configured to allocate time-and-frequency resources to the UEs using the minimum combining zones assigned to the UEs; and wherein the scheduler is configured to, after allocating time-and-frequency resources to the UEs, attempt to expand the combining zones used for receiving uplink transmissions.

Example 17 includes the system of Example 16, wherein the controller is configured to assign to each UE a respective interference zone comprising a respective subset of the radio points that cannot be included in the combining zone of the combining receiver for receiving uplink transmission from that UE.

Example 18 includes the system of Example 17, wherein the scheduler is configured to determine if multiple UEs are able to make respective uplink transmissions during the same time-and-frequency resource based on the respective minimum combining zones assigned to the UEs by: determining if the minimum combining zone of a first UE does not include any radio points that are in the signal zone of a second UE and if the minimum combining zone of the second UE does not include any radio points that are in the signal zone of the first UE.

Example 19 includes the system of any of the Examples 17-18, wherein the scheduler is configured to attempt to expand the combining zones used for receiving uplink transmissions for any multiple UEs that are scheduled to make respective uplink transmissions during the same time-and-frequency resource by expanding the combining zone of a first of the multiple UEs to include one or more additional radio points.

Example 20 includes the system of Example 19, wherein the scheduler is configured to attempt to expand the combining zones used for receiving uplink transmissions for the multiple UEs by expanding the combining zone of the first of the multiple UEs to include any radio point in the minimum combining zone of a second of the multiple UEs that is in the signal zone of the first of the multiple UEs.

Example 21 includes the system of any of the Examples 17-20, wherein the controller is configured to assign the respective signal zone for each UE as a function of an ability of including each radio point in the respective combining zone of that UE to benefit the receiving of uplink transmissions from that UE.

Example 22 includes the system of any of the Examples 16-21, wherein the scheduler is configured to attempt to expand the combining zones used for receiving uplink transmissions for a transmission time interval (TTI) by expanding the combining zone of one or more of the UEs if less than a total front-haul capacity for communicating data between the one or more radio points and the controller is not being used for the TTI.

Example 23 includes the system of any of the Examples 15-22, wherein the controller is communicatively coupled to the radio points using a switched ETHERNET network.

Example 24 includes the system of any of the Examples 15-23, wherein the uplink transmissions comprise Physical Uplink Shared Channel (PUSCH) transmissions.

Example 25 includes the system of any of the Examples 15-24, wherein the controller is configured to perform transmit power control for the uplink transmissions from the UEs using a closed-loop UE-specific target SINR that is adapted for each UE based on a power headroom reported for that UE.

Example 26 includes the system of any of the Examples 15-25, wherein the controller is configured to perform transmit power control for the uplink transmissions from the UEs using a closed-loop UE-specific measured SINR that uses: a signal power measurement based on uplink transmissions from that UE; and an interference-plus-noise measurement based on uplink transmissions from all scheduled UEs.

Example 27 includes the system of any of the Examples 15-26, wherein the controller is configured to perform transmit power control for a UE as a function of external interference caused by the uplink transmissions from that UE and of internal interference caused by uplink transmission from that UE.

Example 28 includes the system of any of the Examples 15-27, wherein the scheduler is configured to perform link adaptation for uplink transmissions from the UEs by selecting a modulation and coding scheme (MCS) for each UE based on a measured signal-to-interference-plus-noise ratio (SINR) for the UE and a sequence of acknowledgement and negative acknowledgement (ACK/NACK) messages associated with the uplink transmissions from the UE.

Example 29 includes a system to provide wireless service comprising: a controller; and a plurality of radio points; wherein each of the radio points is associated with at least one antenna and remotely located from the controller, wherein the plurality of radio points is communicatively coupled to the controller; wherein the controller and the plurality of radio points are configured to implement a base station in order to provide wireless service to a plurality of user equipment (UEs) using a cell; wherein the controller is communicatively coupled to a core network of a wireless service provider; wherein the controller is configured to implement a scheduler to schedule uplink transmissions from the UEs; wherein the scheduler is configured to determine if multiple UEs are able to make respective uplink transmissions during a respective same time-and-frequency resource, and, for any multiple UEs that are able to make respective uplink transmissions during the respective same time-and-frequency resource, schedule said multiple UEs to make respective uplink transmissions during the respective same time-and-frequency resource; and wherein the controller is configured to perform transmit power control for the uplink transmissions from the UEs using at least one of the following: a closed-loop UE-specific target SINR that is adapted for each UE based on a power headroom reported for that UE; and a closed-loop UE-specific measured SINR that uses: a signal power measurement based on uplink transmissions from that UE, and an interference-plus-noise measurement based on uplink transmissions from all scheduled UEs.

Example 30 includes the system of Example 29, wherein the controller is configured to perform transmit power control for a UE as a function of external interference caused by the uplink transmissions from that UE and of internal interference caused by uplink transmission from that UE.

Example 31 includes the system of any of the Examples 29-30, wherein the controller is configured to implement a combining receiver to receive the uplink transmissions from each UE, the combining receiver configured to combine data indicative of the uplink transmissions from each UE as received at each radio point included in a combining zone assigned to that UE and communicated to the controller; wherein the controller is configured to assign, to each UE, a respective minimum combining zone comprising a respective minimum subset of the radio points for use as the combining zone of the combining receiver for receiving uplink transmission from that UE; wherein the controller is configured to assign, to each UE, a respective signal zone comprising a respective subset of the radio points that can be included in the combining zone of the combining receiver for receiving uplink transmission from that UE; wherein the scheduler is configured to determine if multiple UEs are able to make respective uplink transmissions during a respective same time-and-frequency resource based on the respective minimum combining zones and signal zones assigned to the UEs; wherein the scheduler is configured to allocate time-and-frequency resources to the UEs using the minimum combining zones assigned to the UEs; and wherein the scheduler is configured to, after allocating time-and-frequency resources to the UEs, attempt to expand the combining zones used for receiving uplink transmissions.

Example 32 includes the system of Example 31, wherein the controller is configured to assign to each UE a respective interference zone comprising a respective subset of the radio points that cannot be included in the combining zone of the combining receiver for receiving uplink transmission from that UE.

Example 33 includes the system of Example 32, wherein the scheduler is configured to determine if multiple UEs are able to make respective uplink transmissions during the same time-and-frequency resource based on the respective minimum combining zones assigned to the UEs by: determining if the minimum combining zone of a first UE does not include any radio points that are in the signal zone of a second UE and if the minimum combining zone of the second UE does not include any radio points that are in the signal zone of the first UE.

Example 34 includes the system of any of the Examples 32-33, wherein the scheduler is configured to attempt to expand the combining zones used for receiving uplink transmissions for any multiple UEs that are scheduled to make respective uplink transmissions during the same time-and-frequency resource by expanding the combining zone of a first of the multiple UEs to include one or more additional radio points.

Example 35 includes the system of Example 34, wherein the scheduler is configured to attempt to expand the combining zones used for receiving uplink transmissions for the multiple UEs by expanding the combining zone of the first of the multiple UEs to include any radio point in the minimum combining zone of a second of the multiple UEs.

Example 36 includes the system of any of the Examples 32-35, wherein the controller is configured to assign the respective signal zone for each UE as a function of an ability of including each radio point in the respective combining zone of that UE to benefit the receiving of uplink transmissions from that UE.

Example 37 includes the system of any of the Examples 31-36, wherein the scheduler is configured to attempt to expand the combining zones used for receiving uplink transmissions for a transmission time interval (TTI) by expanding the combining zone of one or more of the UEs if less than a total front-haul capacity for communicating data between the one or more radio points and the controller is not being used for the TTI.

Example 38 includes the system of any of the Examples 29-37, wherein the controller is communicatively coupled to the radio points using a switched ETHERNET network.

Example 39 includes the system of any of the Examples 29-38, wherein the uplink transmissions comprise Physical Uplink Shared Channel (PUSCH) transmissions.

Example 40 includes the system of any of the Examples 29-39, wherein the scheduler is configured to, for any multiple UEs that are scheduled to make respective uplink transmissions during the same time-and-frequency resource, assign respective UE-specific demodulation reference signal (DM-RS) cyclic shifts to the multiple UEs, each of the UE-specific DM-RS cyclic shifts having an associated distance between that UE-specific DM-RS cyclic shift and each of the other UE-specific DM-RS cyclic shifts, wherein the DM-RS cyclic shifts are assigned to maximize the respective distances.

Example 41 includes the system of any of the Examples 29-40, wherein the scheduler is configured to perform link adaptation for uplink transmissions from the UEs by selecting a modulation and coding scheme (MCS) for each UE based on a measured signal-to-interference-plus-noise ratio (SINR) for the UE and a sequence of acknowledgement and negative acknowledgement (ACK/NACK) messages associated with the uplink transmissions from the UE.

Example 42 includes a system to provide wireless service comprising: a controller; and a plurality of radio points; wherein each of the radio points is associated with at least one antenna and remotely located from the controller, wherein the plurality of radio points is communicatively coupled to the controller; wherein the controller and the plurality of radio points are configured to implement a base station in order to provide wireless service to a plurality of user equipment (UEs) using a cell; wherein the controller is communicatively coupled to a core network of a wireless service provider; wherein the controller is configured to implement a scheduler to schedule uplink transmissions from the UEs; wherein the scheduler is configured to perform link adaptation for uplink transmissions from the UEs by selecting a modulation and coding scheme (MCS) for each UE based on a measured signal-to-interference-plus-noise ratio (SINR) for the UE and a sequence of acknowledgement and negative acknowledgement (ACK/NACK) messages associated with the uplink transmissions from the UE.

Example 43 includes the system of Example 42, wherein selecting the MCS for each UE based on the SINR for the UE and the sequence of ACK/NACK messages associated with the uplink transmissions from the UE comprises: determining an average modified SINR for each UE; determining an augmented average SINR for each UE by applying an adaptation loop variable for the UE to the average modified SINR for the UE; and selecting the MCS for each UE based on the determined augmented average SINR for the UE.

What is claimed is:

1. A system to provide wireless service comprising:
a controller; and
a plurality of radio points;
wherein each of the radio points is associated with at least one antenna, wherein the plurality of radio points is communicatively coupled to the controller;
wherein the controller and the plurality of radio points are configured to implement at least a part of a base station in order to provide wireless service to a plurality of user equipment (UEs) using a cell;
wherein the controller is configured to implement a scheduler to schedule uplink transmissions from the UEs;
wherein the controller is configured to implement a combining receiver to receive uplink transmissions from each UE, the combining receiver configured to combine data indicative of the uplink transmissions from each UE as received at each radio point included in a combining zone assigned to that UE and communicated to the controller;
wherein the controller is configured to assign, to each UE, a respective minimum combining zone comprising a respective minimum subset of the radio points for use as the combining zone of the combining receiver for receiving uplink transmission from that UE;
wherein the controller is configured to assign, to each UE, a respective signal zone comprising a respective subset of the radio points suitable for inclusion in the combining zone of the combining receiver for receiving uplink transmission from that UE;
wherein the scheduler is configured to identify any groups of multiple UEs suitable for making respective uplink transmissions during a respective same time-and-frequency resource based on the respective minimum combining zones and signal zones assigned to the UEs and allocate time-and-frequency resources to the UEs using the minimum combining zones assigned to the UEs; and
wherein the scheduler is configured to, after allocating time-and-frequency resources to the UEs, attempt to expand the combining zones used for receiving uplink transmissions.

2. The system of claim 1, wherein the controller is configured to assign to each UE a respective interference zone comprising a respective subset of the radio points that are not suitable for inclusion in the combining zone of the combining receiver for receiving uplink transmission from that UE.

3. The system of claim 2, wherein the scheduler is configured to identify any groups of multiple UEs suitable for making respective uplink transmissions during the same time-and-frequency resource based on the respective minimum combining zones assigned to the UEs by:
determining if the minimum combining zone of a first UE does not include any radio points that are in the signal zone of a second UE and if the minimum combining zone of the second UE does not include any radio points that are in the signal zone of the first UE.

4. The system of claim 2, wherein the scheduler is configured to attempt to expand the combining zones used for receiving uplink transmissions for any group of multiple UEs that are scheduled to make respective uplink transmissions during the same time-and-frequency resource by expanding the combining zone of a first of the multiple UEs to include one or more additional radio points.

5. The system of claim 4, wherein the scheduler is configured to attempt to expand the combining zones used for receiving uplink transmissions for the multiple UEs by expanding the combining zone of the first of the multiple UEs to include any radio point in the minimum combining zone of a second of the multiple UEs that is in the signal zone of the first of the multiple UEs.

6. The system of claim 2, wherein the controller is configured to assign the respective signal zone for each UE as a function of an ability of including each radio point in the respective combining zone of that UE to benefit the receiving of uplink transmissions from that UE.

7. The system of claim 1, wherein the scheduler is configured to attempt to expand the combining zones used for receiving uplink transmissions for a transmission time interval (TTI) by expanding the combining zone of one or more of the UEs if less than a total front-haul capacity for communicating data between the one or more radio points and the controller is not being used for the TTI.

8. The system of claim 1, wherein the controller is communicatively coupled to the radio points using a switched ETHERNET network.

9. The system of claim 1, wherein the uplink transmissions comprise Physical Uplink Shared Channel (PUSCH) transmissions.

10. The system of claim 1, wherein the scheduler is configured to, for any group of multiple UEs that are scheduled to make respective uplink transmissions during the same time-and-frequency resource, assign respective UE-specific demodulation reference signal (DM-RS) cyclic shifts to the multiple UEs, each of the UE-specific DM-RS cyclic shifts having an associated distance between that UE-specific DM-RS cyclic shift and each of the other UE-specific DM-RS cyclic shifts, wherein the DM-RS cyclic shifts are assigned to maximize the respective distances.

11. The system of claim 1, wherein the controller is configured to perform transmit power control for the uplink transmissions from the UEs using a closed-loop UE-specific target that is adapted for each UE based on a power headroom reported for that UE.

12. The system of claim 1, wherein the controller is configured to perform transmit power control for the uplink transmissions from the UEs using a closed-loop UE-specific measured signal-to-interference-plus-noise ratio (SINR) that uses: a signal power measurement based on uplink transmissions from that UE; and
an interference-plus-noise measurement based on uplink transmissions from all scheduled UEs.

13. The system of claim 1, wherein the controller is configured to perform transmit power control for a UE as a function of external interference caused by the uplink transmissions from that UE and of internal interference caused by uplink transmission from that UE.

14. The system of claim 1, wherein the scheduler is configured to perform link adaptation for uplink transmissions from the UEs by selecting a modulation and coding scheme (MCS) for each UE based on a measured signal-to-interference-plus-noise ratio (SINR) for the UE and a sequence of acknowledgement and negative acknowledgement (ACK/NACK) messages associated with the uplink transmissions from the UE.

15. A system to provide wireless service comprising:
a controller; and
a plurality of radio points;
wherein each of the radio points is associated with at least one antenna, wherein the plurality of radio points is communicatively coupled to the controller;
wherein the controller and the plurality of radio points are configured to implement at least a part of a base station in order to provide wireless service to a plurality of user equipment (UEs) using a cell;
wherein the controller is configured to implement a scheduler to schedule uplink transmissions from the UEs;
wherein the scheduler is configured to identify any groups of multiple UEs suitable for making respective uplink transmissions during a respective same time-and-frequency resource, and, for any group of multiple UEs suitable for making respective uplink transmissions during the respective same time-and-frequency resource, schedule said multiple UEs to make respective uplink transmissions during the respective same time-and-frequency resource and assign respective UE-specific demodulation reference signal (DM-RS) cyclic shifts to said multiple UEs; and
wherein each of the UE-specific DM-RS cyclic shifts have an associated distance between that UE-specific DM-RS cyclic shift and each of the other UE-specific DM-RS cyclic shifts, wherein the DM-RS cyclic shifts are assigned to maximize the respective distances.

16. The system of claim 15, wherein the controller is configured to implement a combining receiver to receive the uplink transmissions from each UE, the combining receiver configured to combine data indicative of the uplink transmissions from each UE as received at each radio point included in a combining zone assigned to that UE and communicated to the controller;
wherein the controller is configured to assign, to each UE, a respective minimum combining zone comprising a respective minimum subset of the radio points for use as the combining zone of the combining receiver for receiving uplink transmissions from that UE;
wherein the controller is configured to assign, to each UE, a respective signal zone comprising a respective subset of the radio points suitable for inclusion in the combining zone of the combining receiver for receiving uplink transmission from that UE;
wherein the scheduler is configured to identify any groups of multiple UEs suitable for making respective uplink transmissions during a respective same time-and-frequency resource based on the respective minimum combining zones and signal zones assigned to the UEs;
wherein the scheduler is configured to allocate time-and-frequency resources to the UEs using the minimum combining zones assigned to the UEs; and
wherein the scheduler is configured to, after allocating time-and-frequency resources to the UEs, attempt to expand the combining zones used for receiving uplink transmissions.

17. The system of claim 16, wherein the controller is configured to assign to each UE a respective interference zone comprising a respective subset of the radio points that are not suitable for inclusion in the combining zone of the combining receiver for receiving uplink transmission from that UE.

18. The system of claim 17, wherein the scheduler is configured to identify any groups of multiple UEs suitable for making respective uplink transmissions during the same time-and-frequency resource based on the respective minimum combining zones assigned to the UEs by:
determining if the minimum combining zone of a first UE does not include any radio points that are in the signal zone of a second UE and if the minimum combining zone of the second UE does not include any radio points that are in the signal zone of the first UE.

19. The system of claim 17, wherein the scheduler is configured to attempt to expand the combining zones used for receiving uplink transmissions for any group of multiple UEs that are scheduled to make respective uplink transmissions during the same time-and-frequency resource by expanding the combining zone of a first of the multiple UEs to include one or more additional radio points.

20. The system of claim 19, wherein the scheduler is configured to attempt to expand the combining zones used for receiving uplink transmissions for the multiple UEs by expanding the combining zone of the first of the multiple UEs to include any radio point in the minimum combining zone of a second of the multiple UEs that is in the signal zone of the first of the multiple UEs.

21. The system of claim 17, wherein the controller is configured to assign the respective signal zone for each UE as a function of an ability of including each radio point in the respective combining zone of that UE to benefit the receiving of uplink transmissions from that UE.

22. The system of claim 16, wherein the scheduler is configured to attempt to expand the combining zones used for receiving uplink transmissions for a transmission time interval (TTI) by expanding the combining zone of one or more of the UEs if less than a total front-haul capacity for communicating data between the one or more radio points and the controller is not being used for the TTI.

23. The system of claim 15, wherein the controller is communicatively coupled to the radio points using a switched ETHERNET network.

24. The system of claim 15, wherein the uplink transmissions comprise Physical Uplink Shared Channel (PUSCH) transmissions.

25. The system of claim 15, wherein the controller is configured to perform transmit power control for the uplink transmissions from the UEs using a closed-loop UE-specific target signal-to-interference-plus-noise ratio (SINR) that is adapted for each UE based on a power headroom reported for that UE.

26. The system of claim 15, wherein the controller is configured to perform transmit power control for the uplink transmissions from the UEs using a closed-loop UE-specific measured signal-to-interference-plus-noise ratio (SINK) that uses: a signal power measurement based on uplink transmissions from that UE; and
an interference-plus-noise measurement based on uplink transmissions from all scheduled UEs.

27. The system of claim 15, wherein the controller is configured to perform transmit power control for a UE as a function of external interference caused by the uplink transmissions from that UE and of internal interference caused by uplink transmission from that UE.

28. The system of claim 15, wherein the scheduler is configured to perform link adaptation for uplink transmissions from the UEs by selecting a modulation and coding scheme (MCS) for each UE based on a measured signal-to-interference-plus-noise ratio (SINR) for the UE and a sequence of acknowledgement and negative acknowledgement (ACK/NACK) messages associated with the uplink transmissions from the UE.

29. A system to provide wireless service comprising:
a controller; and
a plurality of radio points;
wherein each of the radio points is associated with at least one antenna, wherein the plurality of radio points is communicatively coupled to the controller;
wherein the controller and the plurality of radio points are configured to implement at least a part of a base station in order to provide wireless service to a plurality of user equipment (UEs) using a cell;
wherein the controller is configured to implement a scheduler to schedule uplink transmissions from the UEs;
wherein the scheduler is configured to identify any groups of multiple UEs suitable for making respective uplink transmissions during a respective same time-and-frequency resource, and, for any multiple UEs that are able to make respective uplink transmissions during the respective same time-and-frequency resource, schedule said multiple UEs to make respective uplink transmissions during the respective same time-and-frequency resource; and
wherein the controller is configured to perform transmit power control for the uplink transmissions from the UEs using at least one of the following:
a closed-loop UE-specific target signal-to-interference-plus-noise ratio (SINR) that is adapted for each UE based on a power headroom reported for that UE; and
a closed-loop UE-specific measured SINR that uses: a signal power measurement based on uplink transmissions from that UE, and an interference-plus-noise measurement based on uplink transmissions from all scheduled UEs.

30. The system of claim 29, wherein the controller is configured to perform transmit power control for a UE as a function of external interference caused by the uplink transmissions from that UE and of internal interference caused by uplink transmission from that UE.

31. The system of claim 29, wherein the controller is configured to implement a combining receiver to receive the uplink transmissions from each UE, the combining receiver configured to combine data indicative of the uplink transmissions from each UE as received at each radio point included in a combining zone assigned to that UE and communicated to the controller;
wherein the controller is configured to assign, to each UE, a respective minimum combining zone comprising a respective minimum subset of the radio points for use as the combining zone of the combining receiver for receiving uplink transmission from that UE;
wherein the controller is configured to assign, to each UE, a respective signal zone comprising a respective subset of the radio points suitable for inclusion in the combining zone of the combining receiver for receiving uplink transmission from that UE;
wherein the scheduler is configured to identify any groups of multiple UEs suitable for making respective uplink transmissions during a respective same time-and-frequency resource based on the respective minimum combining zones and signal zones assigned to the UEs;
wherein the scheduler is configured to allocate time-and-frequency resources to the UEs using the minimum combining zones assigned to the UEs; and
wherein the scheduler is configured to, after allocating time-and-frequency resources to the UEs, attempt to expand the combining zones used for receiving uplink transmissions.

32. The system of claim 31, wherein the controller is configured to assign to each UE a respective interference zone comprising a respective subset of the radio points that are not suitable for inclusion in the combining zone of the combining receiver for receiving uplink transmission from that UE.

33. The system of claim 32, wherein the scheduler is configured to identify any groups of multiple UEs suitable for making respective uplink transmissions during the same time-and-frequency resource based on the respective minimum combining zones assigned to the UEs by:
determining if the minimum combining zone of a first UE does not include any radio points that are in the signal zone of a second UE and if the minimum combining zone of the second UE does not include any radio points that are in the signal zone of the first UE.

34. The system of claim 32, wherein the scheduler is configured to attempt to expand the combining zones used for receiving uplink transmissions for any groups of multiple UEs that are scheduled to make respective uplink transmissions during the same time-and-frequency resource by expanding the combining zone of a first of the multiple UEs to include one or more additional radio points.

35. The system of claim 34, wherein the scheduler is configured to attempt to expand the combining zones used for receiving uplink transmissions for the multiple UEs by expanding the combining zone of the first of the multiple UEs to include any radio point in the minimum combining zone of a second of the multiple UEs.

36. The system of claim 32, wherein the controller is configured to assign the respective signal zone for each UE as a function of an ability of including each radio point in the respective combining zone of that UE to benefit the receiving of uplink transmissions from that UE.

37. The system of claim 31, wherein the scheduler is configured to attempt to expand the combining zones used for receiving uplink transmissions for a transmission time interval (TTI) by expanding the combining zone of one or more of the UEs if less than a total front-haul capacity for communicating data between the one or more radio points and the controller is not being used for the TTI.

38. The system of claim 29, wherein the controller is communicatively coupled to the radio points using a switched ETHERNET network.

39. The system of claim 29, wherein the uplink transmissions comprise Physical Uplink Shared Channel (PUSCH) transmissions.

40. The system of claim 29, wherein the scheduler is configured to, for any group of multiple UEs that are scheduled to make respective uplink transmissions during the same time-and-frequency resource, assign respective UE-specific demodulation reference signal (DM-RS) cyclic shifts to the multiple UEs, each of the UE-specific DM-RS cyclic shifts having an associated distance between that UE-specific DM-RS cyclic shift and each of the other UE-specific DM-RS cyclic shifts, wherein the DM-RS cyclic shifts are assigned to maximize the respective distances.

41. The system of claim 29, wherein the scheduler is configured to perform link adaptation for uplink transmissions from the UEs by selecting a modulation and coding scheme (MCS) for each UE based on a measured signal-to-interference-plus-noise ratio (SINR) for the UE and a sequence of acknowledgement and negative acknowledgement (ACK/NACK) messages associated with the uplink transmissions from the UE.

42. A system to provide wireless service comprising:
a controller; and
a plurality of radio points;
wherein each of the radio points is associated with at least one antenna, wherein the plurality of radio points is communicatively coupled to the controller;
wherein the controller and the plurality of radio points are configured to implement at least a part of a base station in order to provide wireless service to a plurality of user equipment (UEs) using a cell;
wherein the controller is configured to implement a scheduler to schedule uplink transmissions from the UEs;
wherein the scheduler is configured to perform link adaptation for uplink transmissions from the UEs by selecting a modulation and coding scheme (MCS) for each UE based on a measured signal-to-interference-plus-noise ratio (SINR) for the UE and a sequence of acknowledgement and negative acknowledgement (ACK/NACK) messages associated with the uplink transmissions from the UE.

43. The system of claim 42, wherein selecting the MCS for each UE based on the SINR for the UE and the sequence of ACK/NACK messages associated with the uplink transmissions from the UE comprises:
determining an average modified SINR for each UE;
determining an augmented average SINR for each UE by applying an adaptation loop variable for the UE to the average modified SINR for the UE; and
selecting the MCS for each UE based on the determined augmented average SINR for the UE.

44. The system of claim 1, wherein the combining receiver comprises an interference-rejection combining (IRC) receiver.

45. The system of claim 16, wherein the combining receiver comprises an interference-rejection combining (IRC) receiver.

46. The system of claim 31, wherein the combining receiver comprises an interference-rejection combining (IRC) receiver.

47. The system of claim 1, wherein each of the radio points is remotely located from the controller.

48. The system of claim 15, wherein each of the radio points is remotely located from the controller.

49. The system of claim 29, wherein each of the radio points is remotely located from the controller.

50. The system of claim 42, wherein each of the radio points is remotely located from the controller.

* * * * *